United States Patent
Rhim et al.

(10) Patent No.: US 11,528,683 B2
(45) Date of Patent: Dec. 13, 2022

(54) METHOD AND APPARATUS FOR TRANSMITTING CONTROL MESSAGE IN WIRELESS COMMUNICATION SYSTEM

(71) Applicant: Samsung Electronics Co., Ltd., Suwon-si (KR)

(72) Inventors: Wonwoo Rhim, Suwon-si (KR); Daejoong Kim, Suwon-si (KR); Jaeyoel Kim, Suwon-si (KR); Namryul Jeon, Suwon-si (KR); Sunguk Huh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 17/073,986

(22) Filed: Oct. 19, 2020

(65) Prior Publication Data

US 2021/0120527 A1    Apr. 22, 2021

(30) Foreign Application Priority Data

Oct. 18, 2019  (KR) .................... 10-2019-0130272

(51) Int. Cl.
*H04W 56/00* (2009.01)
*H04W 72/00* (2009.01)
*H04W 72/04* (2009.01)
*H04L 27/26* (2006.01)

(52) U.S. Cl.
CPC ..... *H04W 72/005* (2013.01); *H04W 72/0406* (2013.01); *H04W 72/0446* (2013.01); *H04L 27/2607* (2013.01)

(58) Field of Classification Search
CPC .......... H04W 72/005; H04W 72/0406; H04W 72/0446; H04W 27/2607

USPC ......................................................... 370/312
See application file for complete search history.

(56) References Cited

U.S. PATENT DOCUMENTS

| | | | |
|---|---|---|---|
| 10,348,386 B1 | 7/2019 | Nammi et al. | |
| 2011/0103286 A1* | 5/2011 | Montojo ............... | H04W 48/08 370/312 |
| 2015/0312927 A1 | 10/2015 | Ko et al. | |
| 2017/0331647 A1* | 11/2017 | Abdelghaffar .... | H04L 27/26265 |
| 2018/0242167 A1 | 8/2018 | Bottari et al. | |
| 2018/0278355 A1* | 9/2018 | Shin .................. | H04W 72/0446 |

(Continued)

FOREIGN PATENT DOCUMENTS

WO   2017/028933 A1   2/2017
WO   2019/033078 A1   2/2019

OTHER PUBLICATIONS

O-RAN; O-RAN Working Group 8; Base Station O-DU and O-CU Software Architecture and APIs; ORAN-WG8.AAD-v01.0.0 Technical Specification; Jul. 2019.

(Continued)

*Primary Examiner* — Sai Ming Chan
(74) *Attorney, Agent, or Firm* — Jefferson IP Law, LLP

(57) ABSTRACT

A system and method of generating a control message of a digital unit (DU) of a base station in a wireless communication system supporting lower layer function division, and a system and method of processing a control message of a radio unit (RU) of the base station are provided. The system and method provide an RU of the base station that does not need to analyze the subframe structure in association with other control plane sections, such that processing time and processing complexity can be reduced.

22 Claims, 28 Drawing Sheets

(56) References Cited

U.S. PATENT DOCUMENTS

| | | |
|---|---|---|
| 2019/0289497 A1 | 9/2019 | Rajagopal |
| 2020/0137529 A1* | 4/2020 | Yu .................... H04L 27/2607 |
| 2020/0178351 A1 | 6/2020 | Davydov et al. |
| 2021/0028984 A1* | 1/2021 | Da Silva ............. H04L 41/0823 |
| 2021/0144738 A1* | 5/2021 | Yoshioka ............. H04L 5/0044 |

OTHER PUBLICATIONS

International Search Report dated Jan. 25, 2021; International Appln. No. PCT/KR2020/014249.
O-RAN Alliance; O-RAN Fronthaul Working Group Control, User and Synchronization Plane Specification; ORAN-WG4.CUS.0-v02.00 Technical Specification; XP 9527536A; Aug. 2, 2019.
European Extended Search Report dated Sep. 1, 2022; European Appln. No. 20876114.8-1213/4023007 PCT/KR2020014249.

* cited by examiner

FIG. 5

| Section Type : any | | | | | | | | # of bytes | |
|---|---|---|---|---|---|---|---|---|---|
| 0 (mbs) | 1 | 2 | 3 | 4 | 5 | 6 | 7 (lsb) | | |
| ecpriVersion (500) | | | ecpriReserved (510) | | | | ecpriConcatenation (520) | 1 | Octet 1 |
| ecpriMessage (530) | | | | | | | | 1 | Octet 2 |
| ecpriPayload (540) | | | | | | | | 2 | Octet 3 |
| ecpriRtcid / ecpriPcid (550) | | | | | | | | 2 | Octet 5 |
| ecpriSeqid (560) | | | | | | | | 2 | Octet 7 |

FIG. 7

| Section Type 1 : DL/UL control msgs | | | | | | | | # of bytes | |
|---|---|---|---|---|---|---|---|---|---|
| 0 (mbs) | 1 | 2 | 3 | 4 | 5 | 6 | 7 (lsb) | | |
| transport header (700) | | | | | | | | 8 | Octet 1 |
| data Direction | payloadVersion | | | filterIndex (704) | | | | 1 | Octet 9 |
| frameId (706) | | | | | | | | 1 | Octet 10 |
| subframeId (708) | | | | slotId (710) | | | | 1 | Octet 11 |
| slotId | | | startSymbolId (712) | | | | | 1 | Octet 12 |
| numberOfsections (714) | | | | | | | | 1 | Octet 13 |
| sectionType (716) | | | | | | | | 1 | Octet 14 |
| udCompHdr (718) | | | | | | | | 1 | Octet 15 |
| reserved | | | | | | | | 1 | Octet 16 |
| sectionId | | | | | | | | 1 | Octet 17 |
| sectionId | | | rb | symInc | startPrbc | | | 1 | Octet 18 |
| startPrbc | | | | | | | | 1 | Octet 19 |
| numPrbc | | | | | | | | 1 | Octet 20 |
| reMask | | | | | | | | 1 | Octet 21 |
| reMask | | | numSymbol | | | | | 1 | Octet 22 |
| ef | | beamId | | | | | | 1 | Octet 23 |
| beamId | | | | | | | | 1 | Octet 24 |
| <section extensions if any> | | | | | | | | 0-var | |
| ... | | | | | | | | | |
| sectionId = P | | | | | | | | 1 | Octet N |
| sectionId (722) | | | rb(724) | symInc | startPrbc (726) | | | 1 | N+1 |
| startPrbc | | | | | | | | 1 | N+2 |
| numPrbc (728) | | | | | | | | 1 | N+3 |
| reMask (730) | | | | | | | | 1 | N+4 |
| reMask | | | numSymbol (732) | | | | | 1 | N+5 |
| ef (734) | | beamId (736) | | | | | | 1 | N+6 |
| beamId (738) | | | | | | | | 1 | N+7 |
| <section extensions if any> | | | | | | | | 1 | N+8 |
| | | | | | | | | | |

702 — (pointing to data Direction row)

Application header (740) — brace covering Octet 9 through Octet 16

Section extension (720) — brace covering rows near Octet 23

Section header (742) — brace covering N+1 through N+8

FIG. 8

| | Section Type 3 : PRACH & mixed-numer | | | | | | | | # of bytes | |
|---|---|---|---|---|---|---|---|---|---|---|
| | 0 (mbs) | 1 | 2 | 3 | 4 | 5 | 6 | 7 (lsb) | | |
| Transport header (820) | transport header ||||||||| 8 | Octet 1 |
| Application header (830) | data Direction | payloadVersion ||| filterIndex |||| 1 | Octet 9 |
| | frameId ||||||||| 1 | Octet 10 |
| | subframeId |||| slotId |||| 1 | Octet 11 |
| | slotId || startSymbolId ||||||| 1 | Octet 12 |
| | numberOfsections ||||||||| 1 | Octet 13 |
| | sectionType = 1 ||||||||| 1 | Octet 14 |
| | reserved ||||||||| 1 | Octet 15 |
| | udCompHdr ||||||||| 1 | Octet 16 |
| Section header (840) | sectionId ||||||||| 1 | Octet 17 |
| | sectionId ||| rb | symInc | startPrbc |||| 1 | Octet 18 |
| | startPrbc ||||||||| 1 | Octet 19 |
| | numPrbc ||||||||| 1 | Octet 20 |
| | reMask [11:4] ||||||||| 1 | Octet 21 |
| | reMask [3:0] |||| numSymbol |||| 1 | Octet 22 |
| | ef (800) | beamId [14:8] |||||||| 1 | Octet 23 |
| | beamId [7:0] ||||||||| 1 | Octet 24 |
| Section Extension (810) | ef (850) | extType (852) |||||||| 1 | Octet 25 |
| | extLen (854) ||||||||| 1 | Octet 26 |
| | multi-byte section extension payload (856) ||||||||| var | Octet 27 |
| | zero padding to achieve 4-byte alignment as needed (858) ||||||||| | |

Downlink transmission

FIG. 15A

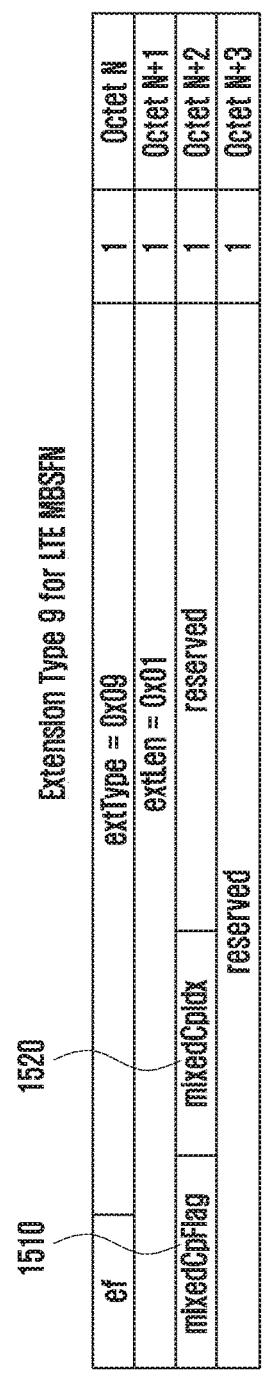

Extension Type 9 for LTE MBSFN

| | | |
|---|---|---|
| ef | extType = 0x09 | Octet N |
| | extLen = 0x01 | Octet N+1 |
| mixedCpsFlag | mixedCpIdx | reserved | Octet N+2 |
| reserved | Octet N+3 |

1510 — ef
1520 — mixedCpIdx

| Field | Description | Value range | Type | Field length |
|---|---|---|---|---|
| mixedCpsFlag | Whether Normal CP and Extended CP in Subframe are mixed | 0 = non-mixed, 1 = mixed | binary bit | 1 bit |
| mixedCpIdx | Number of Normal CPs in Subframe | 0 is one Normal CP, 1 is two Normal CPs | binary bit | 1 bit |

FIG. 17

Section Type=3 Section Fields — 1705

| sectionId | | | | 1 | Octet 21 |
|---|---|---|---|---|---|
| sectionId | rb | symInc | startPrbc | 1 | Octet 22 |
| startPrbc | | | | 1 | Octet 23 |
| numPrbc | | | | 1 | Octet 24 |
| reMask[11:4] | | | | 1 | Octet 25 |
| reMask[3:0] | | numSymbol | | 1 | Octet 26 |
| ef | beamId[14:8] | | | 1 | Octet 27 |
| beamId[7:0] | | | | 1 | Octet 28 |
| freqOffset | | | | 1 | Octet 29 |
| mixedCpIdx | | reserved (6 bits) | | 3 | Octet 32 | mixedCpFlag — 1710
mixedCpIdx — 1720
(reserved: 8 bits → 6 bits)

| Field | Description | Value range | Type | Field length |
|---|---|---|---|---|
| mixedCpFlag | Whether Normal CP and Extended CP in Subframe are mixed | 0 = non-mixed, 1 = mixed | binary bit | 1 bit |
| mixedCpIdx | Number of Normal CPs in Subframe | 0 is one Normal CP, 1 is two Normal CPs | binary bit | 1 bit |

| | Symbol#0 | Zeros | Symbol#1 | Symbol#2 | Symbol#3 | Symbol#4 | Symbol#5 | Symbol#6 | Symbol#7 | Symbol#8 | Symbol#9 | Symbol#10 | Symbol#11 |
|---|---|---|---|---|---|---|---|---|---|---|---|---|---|
| CP Mode | NCP | | ECP | ECP | ECP | ECP | ECP | ECP | ECP | ECP | ECP | ECP | ECP |
| Symbol Length | FFT Size=512 | 552 | | 640 | 640 | 640 | 640 | 640 | 640 | 640 | 640 | 640 | 640 | 640 |
| | FFT Size=1024 | 1104 | 88 | 1280 | 1280 | 1280 | 1280 | 1280 | 1280 | 1280 | 1280 | 1280 | 1280 | 1280 |
| | FFT Size=2048 | 2208 | 176 | 2560 | 2560 | 2560 | 2560 | 2560 | 2560 | 2560 | 2560 | 2560 | 2560 | 2560 |
| | | | 352 | | | | | | | | | | | |

FIG. 22

| | | Symbol#0 | Symbol#1 | Zeros | Symbol#2 | Symbol#3 | Symbol#4 | Symbol#5 | Symbol#6 | Symbol#7 | Symbol#8 | Symbol#9 | Symbol#10 | Symbol#11 |
|---|---|---|---|---|---|---|---|---|---|---|---|---|---|---|
| | CP Mode | NCP | NCP | | ECP | ECP | ECP | ECP | ECP | ECP | ECP | ECP | ECP | ECP |
| Symbol Length | FFT Size=512 | 552 | 548 | 180 | 640 | 640 | 640 | 640 | 640 | 640 | 640 | 640 | 640 | 640 |
| | FFT Size=1024 | 1104 | 1096 | 360 | 1280 | 1280 | 1280 | 1280 | 1280 | 1280 | 1280 | 1280 | 1280 | 1280 |
| | FFT Size=2048 | 2208 | 2192 | 720 | 2560 | 2560 | 2560 | 2560 | 2560 | 2560 | 2560 | 2560 | 2560 | 2560 |

METHOD AND APPARATUS FOR TRANSMITTING CONTROL MESSAGE IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0130272, filed on Oct. 18, 2019, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for transmitting, receiving, and processing a control message.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a "Beyond 4G Network" or a "Post long-term evolution (LTE) System." The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud radio access network (RAN) as the above-described big data processing technology may also be considered an example of convergence of the 5G technology with the IoT technology.

A base station providing a mobile communication service has an integrated type in which a data processing unit or a digital unit (or distributed unit (DU)) of a base station and a wireless transmission/reception unit or a radio (radio unit or remote unit (RU)) are installed together at a cell site according to the related art. However, since this type of base station is not suitable for the needs of mobile operators who want to build a number of cell sites according to the increase in users and traffic, an improved centralized RAN (C-RAN or cloud RAN) structure has emerged. The C-RAN has a structure in which DUs are intensively arranged in one physical place and only RUs are left at a cell site that transmits and receives radio signals to and from the actual terminal, and the DU and the RU can be connected with an optical cable or a coaxial cable. In addition, as the RU and the DU are separated, an interface standard for communication between them is required, and standards such as common public radio interface (CPRI) are currently used between the RU and the DU. In addition, such a base station structure is standardized in 3rd generation partnership project (3GPP), and open radio access network (O-RAN), an open network standard applicable to 5G systems, has been studied.

In addition, in order to meet the demand for wireless data traffic, a 5G communication system (hereinafter, mixed with 5G system, NR (new radio or next radio) system, etc.) has been studied, it is expected that the 5G system will be able to provide services with high data rates to users, and it is expected that wireless communication services with various purposes, such as the Internet of Things and services that require high reliability for specific purposes, will be provided.

When the base station using the O-RAN operates the MBSFN, there is a need for a method of operation so that the DU transmits a control message including information related to the subframe structure to the RU so that the RU can efficiently determine whether zero padding is required before completing analysis of one subframe.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below.

Additional aspects will be set forth in part in the description which follows and, in part, will be apparent from the description, or may be learned by practice of the presented embodiments.

In accordance with an aspect of the disclosure, a method of generating a control message of a digital unit (DU) of a base station in a wireless communication system supporting lower layer function split of the is provided. The method includes identifying subframe configuration information, generating a control message comprising multimedia broadcast multicast service single frequency network (MBSFN)-related information for the subframe, based on the identification, and transmitting the generated control message to a radio unit (RU) of the base station connected to the DU, wherein the MBSFN-related information is for zero padding in the subframe of the radio unit.

In accordance with another aspect of the disclosure, a method of processing a control message for an RU of a base station in a wireless communication system supporting lower layer function division is provided. The method includes receiving a control message including MBSFN-related information for a subframe from a DU of the base station, and performing zero padding in a subframe, based on the MBSFN-related information.

In accordance with another aspect of the disclosure, a DU device of a base station generating a control message in a wireless communication system supporting lower layer function division is provided. The base station includes a connector configured to transmit and receive a signal with an RU of the base station connected to the DU, and at least one processor or controller configured to identify subframe configuration information, generate a control message comprising MBSFN-related information for the subframe, based on the identification, and control to transmit the generated control message to the RU, wherein the MBSFN-related information is for zero padding in the subframe of the radio unit.

In accordance with another aspect of the disclosure, an RU device of a base station processing a control message in a wireless communication system supporting lower layer function division of the disclosure includes a connector configured to transmit and receive a signal with a DU of the base station, a transceiver configured to wirelessly transmit and receive a signal with a terminal, and at least one processor or controller configured to control to receive a control message comprising MBSFN-related information for a subframe from the DU through the connector, and control to perform zero padding in the subframe, based on the MBSFN-related information.

In accordance with another aspect of the disclosure, since all control plane section analysis of symbol configuration information of one subframe can be reduced by two flag analysis, the processing load of the RU can be reduced.

In accordance with another aspect of the disclosure, since the RU does not need to analyze the subframe structure in association with other control plane sections, the complexity may also be reduced.

In accordance with another aspect of the disclosure, since it is possible to determine whether or not zero padding is required through one control plane message before the analysis of one subframe is completed, a latency for zero padding can be reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages, of certain embodiments of the disclosure will be more apparent from the following description taken in conjunction with the accompanying drawings, in which:

FIG. 5 is a view illustrating a format of an enhanced common public radio interface (eCPRI) header according to an embodiment of the disclosure;

FIG. 7 is a view illustrating a format of a C-plane message of section type 1 according to an embodiment of the disclosure;

FIG. 8 is a view illustrating section extension according to an embodiment of the disclosure;

FIG. 15A is a view illustrating a method of configuring MBSFN related information in a section extension field in a C-plane message according to an embodiment of the disclosure;

FIG. 17 is a view illustrating a method of configuring MBSFN-related information in a section field according to an embodiment of the disclosure;

FIG. 18A is a view illustrating a method of configuring a C-Plane message by a DU using a section extension field in a mixed CP type of LTE MBSFN according to an embodiment of the disclosure;

FIG. 18B is a view illustrating a method of configuring a C-Plane message by a DU using a section extension field in a mixed CP type of LTE MBSFN according to an embodiment of the disclosure;

FIG. 19 is a view illustrating a method of configuring a C-Plane message by using a common header field by a DU in a mixed CP type of LTE MBSFN according to an embodiment of the disclosure;

FIG. 20 is a view illustrating a method of configuring a C-Plane message by using a section field by a DU in a mixed CP type situation of LTE MBSFN according to an embodiment of the disclosure;

FIG. 21 is a view illustrating an example in which an RU determines a zero padding size according to an embodiment of the disclosure;

FIG. 22 is a view illustrating an example in which an RU determines a zero padding size according to an embodiment of the disclosure;

The same reference numerals are used to represent the same elements throughout the drawings.

DETAILED DESCRIPTION

Figure 1:
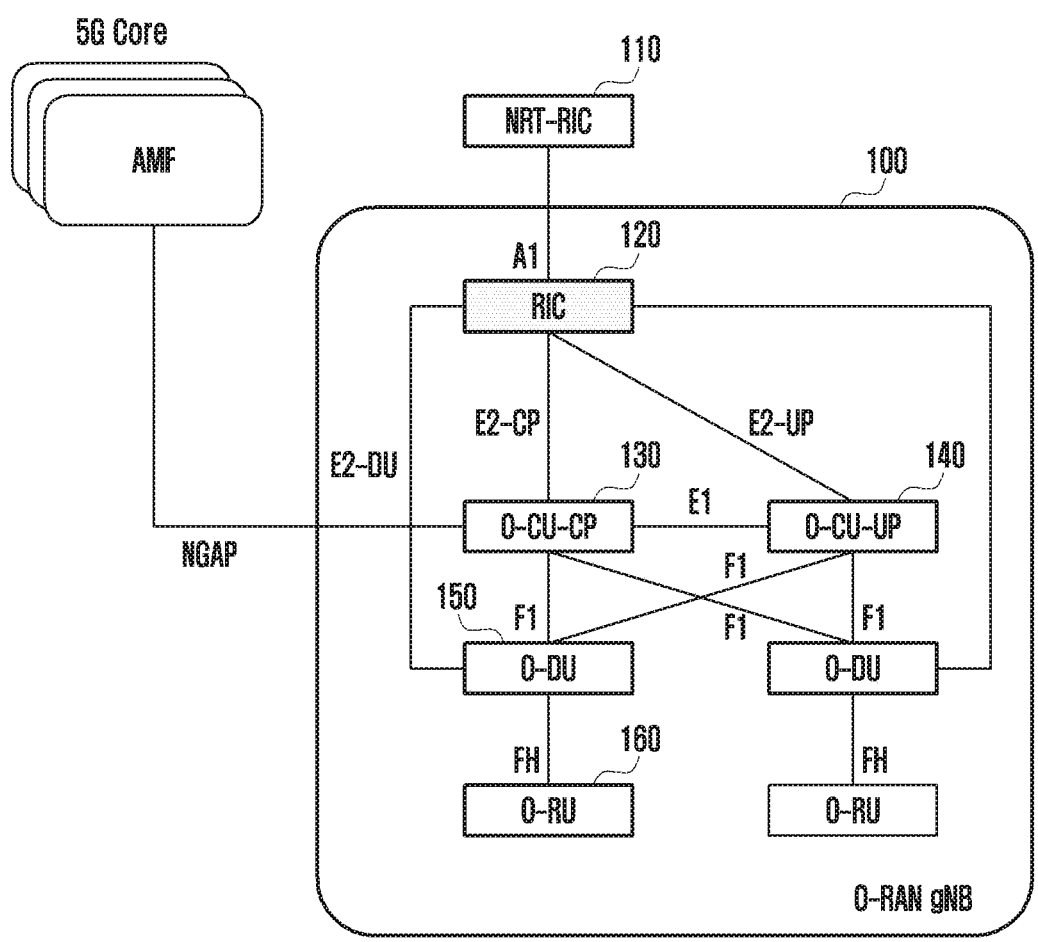
FIG. 1 is a view illustrating an open radio access network (O-RAN) network system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, description of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a non-transitory computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more central processing units (CPUs) within a device or a security multimedia card.

Hereinafter, in the disclosure, uplink (UL) refers to a radio link through which a terminal transmits data or control signals to a base station, and downlink (DL) refers to a radio link through which a base station transmits data or control signals to a terminal. In addition, the base station may be at least one of an evolved NodeB (eNodeB or eNB), a Node B, a base station (BS), a next-generation Node B (gNB) radio access unit, a base station controller, or a node on a network as a subject performing resource allocation of the terminal. The terminal may include a user equipment (UE), a mobile station (MS), a cellular phone, a smart phone, a computer, or a multimedia system capable of performing a communication function.

In order to meet the demand for wireless data traffic, the $5^{th}$ generation (5G) communication system has been commercialized, and it is expected that wireless communication services with various purposes, such as the Internet of Things (IoT) and services that require high reliability for specific purposes, can be provided.

In order to support the network system in which the current $4^{th}$ generation (4G) communication system, 5G communication system, etc. are mixed, in the open radio access network alliance (O-RAN Alliance), established by business operators and equipment providers, the open radio access network (O-RAN) structure has emerged by defining new network elements (NEs) and interface standards based on the existing 3rd generation partnership project (3GPP) standards. O-RAN newly defined a radio unit (RU), a digital unit (DU), a central unit-control plane (CU-CP), and a central unit-user plane (CU-UP), which are the existing 3GPP NEs, as an O-RU, an O-DU, an O-CU-CP, and an O-CU-UP, respectively (these can be collectively referred to as an O-RAN base station), and additionally standardized a near-real-time radio access network (RAN) intelligent controller (RIC) and a non-real-time RAN intelligent controller (NRT-RIC). Each of the O-DU and RIC, O-CU-CP and RIC, and O-CU-UP and RIC can be connected by Ethernet. In addition, interface standards for communication between the O-DU and RIC, between the O-CU-CP and RIC, and between the O-CU-UP and RIC were required. Currently, standards such as an E2-DU, an E2-CU-CP, and an E2-CU-UP can be used between an O-DU, an O-CU-CP, an O-CU-UP, and an RIC.

FIG. 1 is a view illustrating an O-RAN network system according to an embodiment of the disclosure.

Referring to FIG. 1, the O-RAN network is a standard that logically separates the functions of the eNB and gNB of the existing 4G and 5G systems, and in the O-RAN standard, an NRT-RIC 110, an RIC 120, an O-CU-CP 130, an O-CU-UP 140, an O-DU 150, an O-RU 160, and the like, in an O-RAN gNB 100 are defined.

The NRT-RIC 110 is a logical node that enables non-real-time control, optimization of RAN elements and resources, model training, update, and the like. The newly defined RIC 120 is a logical node that enables near-real-time control and optimization of RAN elements and resources, based on the data collected from O-DU 150, O-CU-CP 130, O-CU-UP 140, etc. through an E2 interface by intensively arranging servers in one physical location. The O-CU including the O-CU-CP 130 and the O-CU-UP 140 is a logical node that provides functions of radio resource control (RRC), service data adaptation protocol (SDAP), and packet data convergence protocol (PDCP) protocols. The O-CU-CP 130 is a logical node that provides functions of a control plane portion of RRC and PDCP, and the O-CU-UP 140 is a logical node that provides functions of a user plane portion of SDAP and PDCP. The O-CU-CP 130 is connected to an access and mobility management function (AMF) included in a 5G network (5G core) through a next generation (NG) application protocol (NGAP) interface. The O-DU 150 is a logical node that provides RLC, MAC, and higher physical layer (high-PHY) functions, and the O-RU 160 connected to the O-DU 150 is a logical node that provides low-PHY functions and radio frequency (RF) processing. In FIG. 1, each logical node is shown in a singular number, but each logical node may be connected in plural. For example, a plurality of O-RUs 160 may be connected to one O-DU 150, and a plurality of O-DUs 150 may be connected to one O-CU-UP 140.

The disclosure is not limited by the name of each node described above, and in the case of a logical node or entity performing the above-described function, the configuration of the disclosure may be applied. In addition, the logical node may be physically located in the same location or different locations, and may be provided with a function by the same physical device (e.g., a processor, a controller, etc.) or by another physical device. As an example, the function of at least one logical node described above may be provided through virtualization in one physical device. Hereinafter, O-DU may be mixed with a DU and an O-RU may be mixed with an RU.

Figure 2:
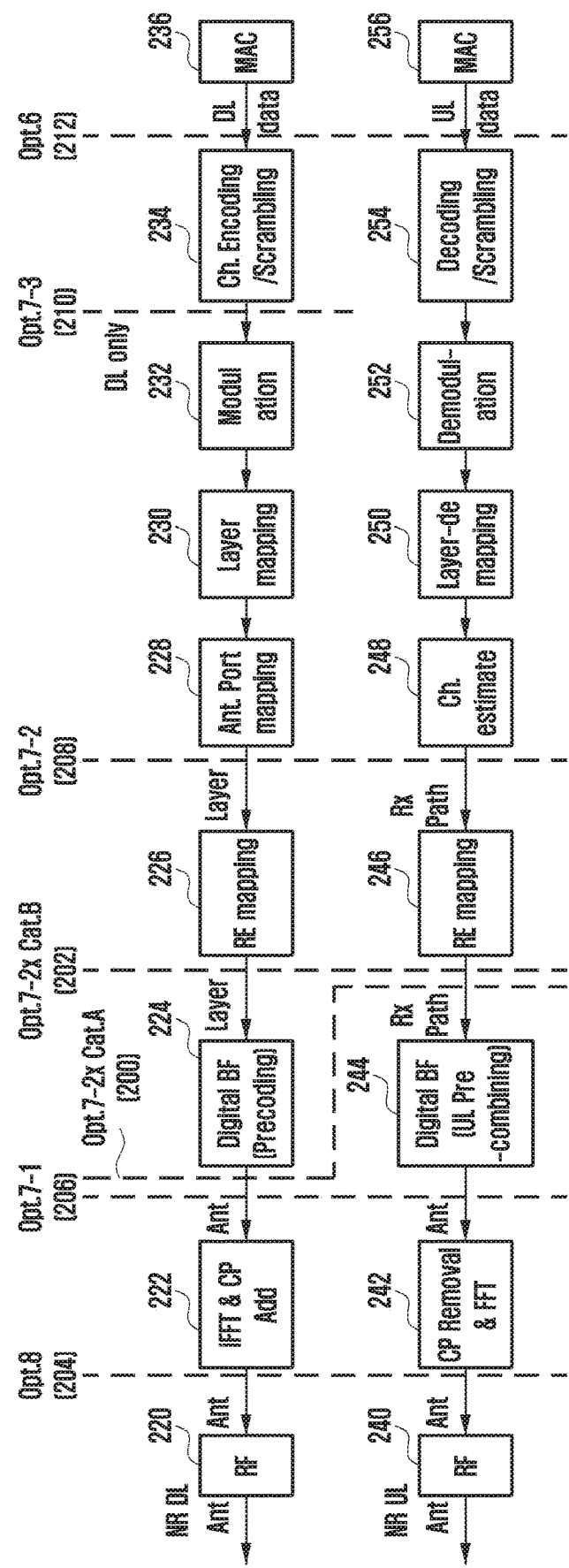
FIG. 2 is a view illustrating an example of a low layer function split through a radio unit (RU) and a digital unit (DU) according to an embodiment of the disclosure.

FIG. 2 is a view illustrating an example of a low layer function split through an RU and a DU according to an embodiment of the disclosure.

3 is a view illustrating the format of a message transmitted between an O-RU and an O-DU according to an embodiment of the disclosure.

Figure 3:
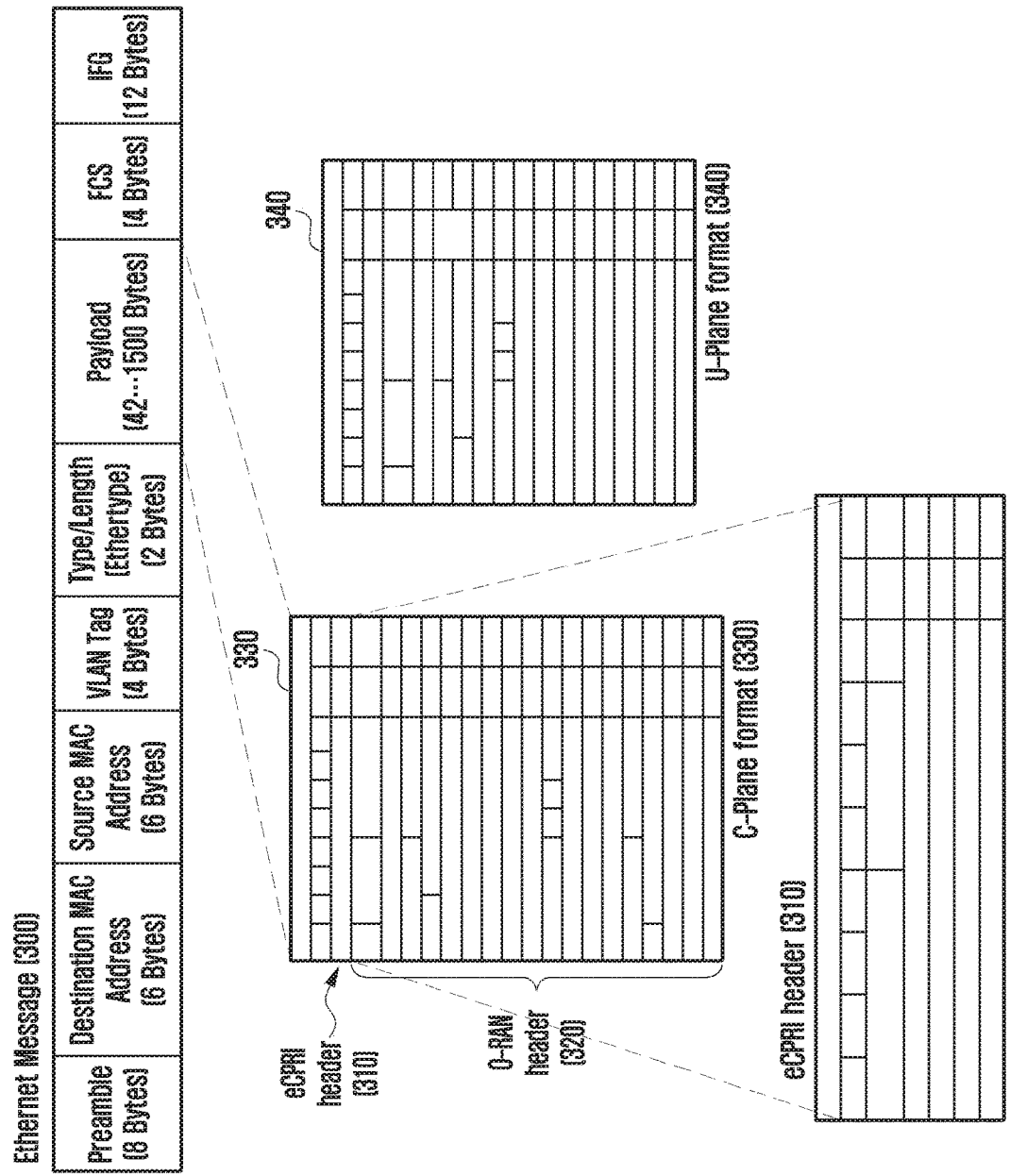
FIG. 3 is a view illustrating a format of a message transmitted between an O-RAN RU (O-RU) and an O-RAN DU (O-DU) according to an embodiment of the disclosure.

Referring to FIGS. 2 and 3, the RU and DU may be connected through a fronthaul (FH). In this case, the RU and DU may each perform a function of a physical layer.

In a physical layer for downlink in a 4G or 5G communication system, channel coding and scrambling for the received data by receiving downlink data from a media access control (MAC) layer 236 are performed at 234, and layer mapping of the modulation symbol is performed at 230 after modulation is performed on the scrambled data at 232. The modulation symbol mapped to each layer is mapped to each antenna port at 228 and is mapped to a corresponding resource element (RE, an allocation unit of resources consisting of one subcarrier and one symbol) at 226. Digital beamforming (which can be mixed with precoding) is performed on the modulation symbol at 224, and inverse fast Fourier transform (FFT) (IFFT) is performed to transform the same into a time domain signal. Thereafter, a cyclic prefix (CP) is added at 222, and the modulation symbol is carried on a carrier frequency in an RF 220 and transmitted to the terminal through an antenna. In addition, in a physical layer for uplink in a 4G or 5G communication system, a signal of a carrier frequency received through an antenna is converted to a baseband signal at an RF 240, the converted signal is transformed into a frequency domain signal through CP removal and FFT at 242, the applied digital beamforming is reversely applied to combine the uplink signal at 244, the signal is de-mapped at 246 in the RE to which the uplink signal was mapped, channel estimation at 248 is performed, layer de-mapping at 250 is performed to demodulate the aligned modulation symbols at 252, and the bit sequence obtained as a result of demodulation is descrambled and decoded to obtain information bits at 254. Thereafter, the information bits are transmitted to a MAC layer 256.

There are various options for dividing the lower layer function, and in FIG. 2, for example, option 6 (212), option 7-3 (210), option 7-2 (208), option 7-2x category B (202), option 7-2x category A (200), option 7-1 (206) and option 8 (204) are shown. In this case, it may be understood that a function located on the right side based on one option is performed by the DU, and a function located on the left side is performed by the RU. For example, the common public radio interface (CPRI) of the long-term evolution (LTE) system corresponds to option 8, and in the case of downlink, a signal to which all the processes of the physical layer shown in FIG. 3 are performed in the DU is transmitted to the RU through the FH, and the RU only converts the received signal into an analog signal and transmits the converted analog signal to the terminal. However, as the number of functions performed by the DU increases, the bandwidth of the required fronthaul increases. Therefore, the O-RAN may support option 7-2x category B (202) and option 7-2x category A (200).

Specifically, category A (200) of option 7-2x corresponds to the capability category of O-RUs that cannot process the precoding of data received by the O-RU from the O-DU, and category B (202) of option 7-2x corresponds to the capability category of the O-RU capable of processing the precoding of data received by the O-RU from the O-DU. The O-DU shall support category A O-RU for 8 or fewer transport streams. That is, it can be said that the O-DU supports precoding of up to 8 transport streams. In this case, when option 7-2x category B (202) is applied, the O-DU transmits information on the modulation symbol that has finished layer mapping and beamforming information to the O-RU, and the O-RU applies beamforming to the modulation symbol and converts the same into an analog signal and transmits the analog signal to the terminal through an antenna.

There are four types of information to be transmitted from the O-DU of Option 7-2x to the O-RU. Information transmitted from a management-plane (M-plane) is transmitted in both directions of DL and UL by non-real-time transmission, and is information for initial configuration or reconfiguration (or reset) between O-DU and O-RU. Information transmitted in a synchronization-plane (the S-plane) is transmitted in real time, and is information for synchronizing or timing synchronization between O-DU and O-RU. Information transmitted in a control-plane (C-plane) is transmitted in the DL direction by real-time transmission, and is information for the O-DU to transmit a scheduling and/or beamforming command to the O-RU. Information transmitted from a U-plane (user-plane) is transmitted in both directions of DL and UL by real-time transmission. DL frequency domain in-phase and quadrature component data (IQ data) (including synchronization signal block (SSB) and reference signal), UL frequency domain IQ data (including a reference signal such as a sounding reference signal) and frequency domain IQ data for a physical random-access channel (PRACH) are transmitted in the U-plane. The information or data can be mixed with the message.

Next, information transmitted between the O-RU and the O-DU will be described in more detail. FIG. 3 is a view illustrating a format of a message transmitted between an O-RU and an O-DU. The O-RU and O-DU are connected by Ethernet, and the standard of the Ethernet message is the same as shown at 300. The payload of the Ethernet message includes a message in a format according to each plane. For example, the format of the C-plane is shown at 330. The C-plane format 330 includes an enhanced CPRI (eCPRI) header 310 and an O-RAN header 320. In addition, the payload may include information of a U-plane format 340 or a format according to another plane.

Figure 4:
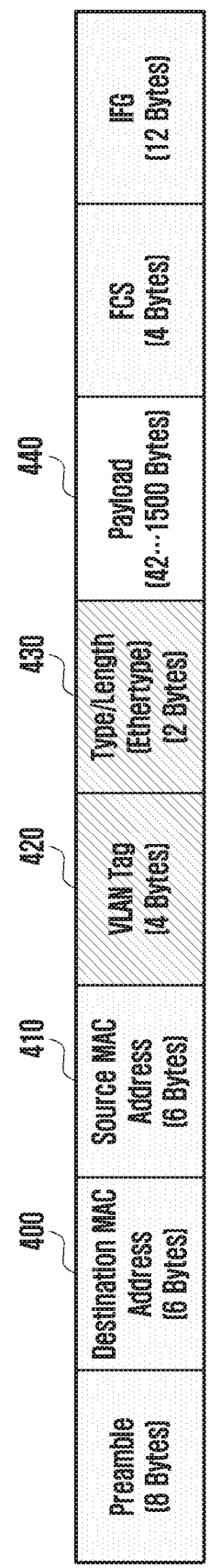
FIG. 4 is a view illustrating in detail a standard of an Ethernet message according to an embodiment of the disclosure.

FIG. 4 is a view illustrating in detail a standard of an Ethernet message according to an embodiment of the disclosure.

Referring to FIG. 4, in the header of the Ethernet message, a destination MAC address 400 indicates the public address of the RU or massive MIMO unit (MMU) in the case of DL, and in the case of UL, a destination MAC address 400 indicates the public address of a specific port of the channel card (which can perform an operation of converting the data format according to the operation of the MAC layer in charge of scheduling, the operation of the high-PHY, and the interface between the RU and the DU) of the DU. A source MAC Address 410 indicates the public address of the RU or MMU in the case of UL, and indicates the public address of a specific port of a channel card of DU in the case of DL.

A virtual local area network (LAN) (VLAN) Tag 420 is 4 bytes, and allows C, U, or S-plane messages to be mapped to different VLAN tags to be managed. The tag protocol identifier (TPID) included in the VLAN tag is 16 bits and is configured as a value of 0x8100 to identify the frame as an IEEE 802.1Q tag frame. Since this field is located at the same position as the Ethertype/Length field 430 in the untagged frame, the field is used to distinguish the untagged frame from the general frame. The tag control information (TCI) included in the VLAN Tag is 16 bits and includes the following three fields. A priority code point (PCP) expresses the priority of a frame with 3 bits. A drop eligible indicator (DEI) is 1 bit and is used separately from or in combination with PCP, and it is removed when traffic is congested so that good frames are classified. The VLAN identifier (VID) is a field indicating which frame the VLAN belongs to with 12 bits. All other values except for the reserved values, 0x000 and 0xFFF, are used as VLAN identifiers, and up to 4,094 VLANs are allowed. A preliminary value of 0x000 indicates that the frame does not belong to any VLAN. In this case, 802.1Q can only designate a priority and refer to it as a priority tag. Since Type/Length (Ethertype) is for eCPRI, it is configured as a fixed value of 0xAEFE.

A payload 440 may include a message according to each plane format including an eCPRI header as shown in FIG. 3. The content of each field or information described in relation to FIG. 4 does not necessarily include all fields, and the disclosure may be implemented by omitting or/and adding other fields as necessary.

FIG. 5 is a view illustrating a format of an eCPRI header according to an embodiment of the disclosure.

Referring to FIG. 5, the eCPRI header is a transport header and is located in front of the Ethernet payload (440 in FIG. 4). The eCPRI header is 8 bytes in total, and an ecpriVersion 500 is 4 bits, and a fixed value of 0001b is used, an ecpriReserved 510 is 3 bits and a fixed value of 0000b is used, an ecpriConcatenation 520 is 1 bit and a fixed value of 0b is used, and an ecpriMessage 530 is 1 byte and indicates the type of message. In the case of U-plane, a value of 0000 0000b (0x0) may be used, in the case of a C-plane, a value of 0000 0010b (0x2) may be used, and in the case of eCPRI delay measurement, a value of 0000 0101b (0x5) may be used.

An ecpriPayload 540 is 2 bytes and represents the size of the payload in bytes, an ecpriRtcid/ecpriPcid 550 is 2 bytes, and the number of bits per field described below can be configured through M-plane configuration. The CU_Port_ID (x bits) included in the ecpriRtcid/ecpriPcid 550 allows the channel card of the RU to be distinguished, and in this case, even a modem can be distinguished. In this case, 2 bits may be used to distinguish a channel card and 2 bits may be used to distinguish a modem. BandSector_ID (y bits) may indicate a corresponding cell or sector. CC_ID (z bits) may indicate a corresponding component carrier. RU_Port_ID (w bits) may be configured to distinguish a layer, an antenna, and the like.

An ecpriSeqid 560 is 2 bytes and is a sequence ID managed for each ecpriRtcid/ecpriPcid 550, and a sequence ID and a subsequence ID are separately managed. Radio-transport-level fragmentation is possible by using the subsequence ID. The content of each field or information described with respect to FIG. 5 does not necessarily include all fields, and the disclosure may be implemented by omitting and/or adding other fields as necessary.

Next, the C-plane message will be described in detail.

Figure 6:
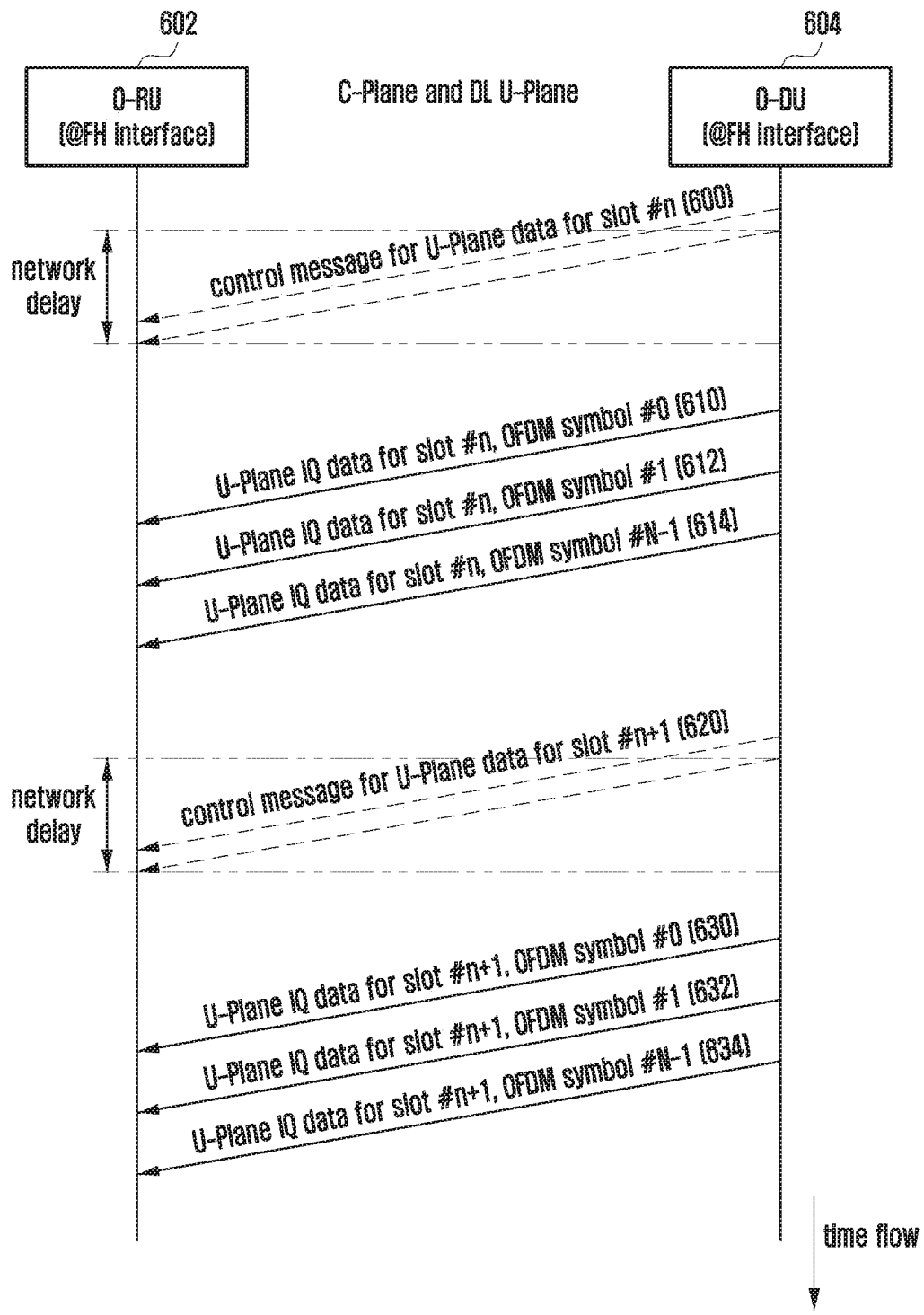
FIG. 6 is a view illustrating a flow in which scheduling and beamforming commands are transmitted through control plane (C-plane) and user plane (U-plane) messages according to an embodiment of the disclosure.

FIG. 6 is a view illustrating a flow in which scheduling and beamforming commands are transmitted through C-plane and U-plane messages according to an embodiment of the disclosure.

Referring to FIG. 6, an O-DU 604 transmits a control (C-plane) message for U-plane data in slot #n to an O-RU 602 at 600. The C-plane message is an eCPRI message type 2, and transfers allocation information for a section and beamforming information corresponding to each section in 6 sectionType messages. A section means an area in which RB resources having the same beam pattern are continuously allocated within one slot, and data of U-plane may be transmitted for each section. In general, one section may include 12 REs (or subcarriers) (that is, 1 resource block (RB)) to 273 RBs on the frequency axis, and may be a rectangle having 1 symbol to 14 symbols on the time axis. One section may include contiguous or non-contiguous allocations. If the beams applied within the 12 REs (1RB) are different, one section may be divided according to a plurality of REMasks having different bit patterns.

Six types of section types can be supported as follows:

sectionType=0: This indicates a DL idle/guard period, which is for transmission blanking for power saving;

sectionType=1: This is used to map a beamforming index or weight to REs of DL and UL channels, which is a beamforming method that is supported mandatorily in O-RAN;

sectionType=3: This is used to map a beamforming index or weight to the RE of a channel in which PRACH and numerology are mixed (mixed-numerology);

sectionType=5: This is used to deliver UE scheduling information so that the RU can calculate real-time beamforming weights, which is a beamforming method that is optionally supported in O-RAN;

sectionType=6: This is used to periodically transmit UE channel information so that the RU can calculate the real-time beamforming weight, which is a beamforming method that is optionally supported in O-RAN; and sectionType=7: This is used for LAA (licensed assisted access) support.

The O-DU 604 transmitting the C-plane message transmits IQ data for each OFDM symbol in slot #n as a U-plane message at 610, 612, and 614. The U-Plane message transfers IQ data (and reference signal, SSB) and PRACH IQ data for a user using eCPRI message type 0. There are two data formats in the U-plane data. In the case of DL/UL user data and static data format, the IQ format and compression method are fixed, and the IQ format and compression method are configured by the M-Plane message at the RU initialization time. In the case of DL/UL user data and dynamic data format, the IQ format and compression method may be dynamically changed, which is configured by a DL U-Plane message and a UL C-Plane message.

Thereafter, the O-DU 604 transmits a C-plane message for U-plane data in slot #n+1 to the O-RU 602 at 620. Thereafter, the O-DU 604 transmits IQ data for each OFDM symbol of slot #n+1 to the O-RU 602 as a U-plane message at 630, 632, and 634.

Although FIG. 6 illustrates the case of DL transmission, the UL transmission may be performed similarly. Specifically, the O-DU transmits a C-plane message, and the O-RU that receives the message transmits IQ data for each symbol of a corresponding slot to an O-DU as a U-plane message.

FIG. 7 is a view illustrating a format of a C-plane message of section type 1 according to an embodiment of the disclosure.

Referring to FIG. 7, a transport header 700 may be an eCPRI header shown in FIG. 5 or information according to IEEE-1914.3. A dataDirection 702 indicates the direction of the U-Plane message, 0 indicates UL, and 1 indicates DL. A filterIndex 704 indicates a channel filter of the RU, and may be configured as 0x1. A frameId 706 indicates a specific frame in units of 10 ms. A subframeId 708 indicates a specific subframe in units of 1 ms in the corresponding frame. A slotId 710 indicates a specific slot in a corresponding frame. A startSymbolid 712 indicates a start Symbol in a corresponding frame.

A numberOfsections 714 indicates the number of sections indicated by the corresponding message. In the case of a SectionType 716, one C-plane message can have only one section type. A udCompHdr 718 indicates the width (bit) of IQ bits for IQ data of all sections of a corresponding message and a compression method. Specifically, upper 4 bits indicate 1 to 16 bits as iqWidth, and lower 4 bits indicate compMeth indicating a compression method. The above-described 702 to 718 are application headers 740 commonly applied to a corresponding message, and are similarly applied to all C-plane messages.

The C-plane message of section type 1 contains information on an arbitrary section. A sectionID 722 indicates the ID of a section, which can be used for matching the C-plane message and the U-plane message. An rb 724 may indicate which physical resource block (PRB) is used, 0 may indicate that all PRBs are used, and 1 may indicate that one PRB (every other PRB) is used for every two. A startPrbc 726 is used to indicate the first PRB of the section, and a numPrbc 728 is used to indicate the number of PRBs in the section. An reMask 730 is a bit pattern indicating an RE (or subcarrier) corresponding to a specific beam in a corresponding PRB, and different beams may be applied in one PRB through the reMask. A numSymbol 732 may indicate the number of symbols corresponding to the corresponding section, an ef 734 may indicate whether a beamforming weight is provided, 0 may indicate that no beamforming weight is provided, and 1 may indicate that a weight according to the beam identifier (beamId) is provided. A beamId 736 and 738 indicates a specific index of a weight table predefined for a corresponding section. The above-described 722 to 738 may be referred to as a section header 742 for each section.

In addition, a section extension may be included in the C-plane message, and whether the section extension is included may be indicated by an ef 720. The content of each field or information described in relation to FIG. 7 does not necessarily include all fields, and the disclosure may be implemented by omitting or/and adding other fields as necessary.

FIG. 8 is a view illustrating section extension according to an embodiment of the disclosure.

Referring to FIG. 8, the C-plane message may include a transport header 820, an application header 830, and one or more section headers 840, and may include a section extension 810. An ef 800 included in the section header 840 may indicate whether a section extension is included, and if there is a section extension, details thereof are as follows.

The section extension 810 may include the following fields. An of 850 indicates whether another section extension is included, and an extType 852 indicates the type of the section extension. In the type of section extension, there may be cases in which a beamforming weight is transmitted, beamforming attributes are transmitted, a precoding setting and parameter is transmitted, a modulation compression related parameter is transmitted, information on non-consecutive PRB allocation is transmitted, and a plurality of extended antenna-carriers (eAxCs), a digital baseband user-plane required for reception or transmission of one carrier in one independent antenna element, which may mean transmission for each layer) are used as a destination. An extLen 854 indicates the length of the corresponding section extension in units of 4 bytes, and the section extension 810 may include zero padding 858 for alignment in units of 4 bytes. The content of each field or information described with respect to FIG. 8 does not necessarily include all fields, and the disclosure may be implemented by omitting and/or adding other fields as necessary.

In addition to the C-plane message according to the section type 1 described above, there may be a C-plane message corresponding to the section type as described above, and may contain the same or different fields or information according to the purpose of each section type.

In recent wireless communication systems, multimedia broadcast multicast service (MBMS) is provided. The MBMS is a broadcast service provided through wireless communication systems such as LTE.

Figure 9:
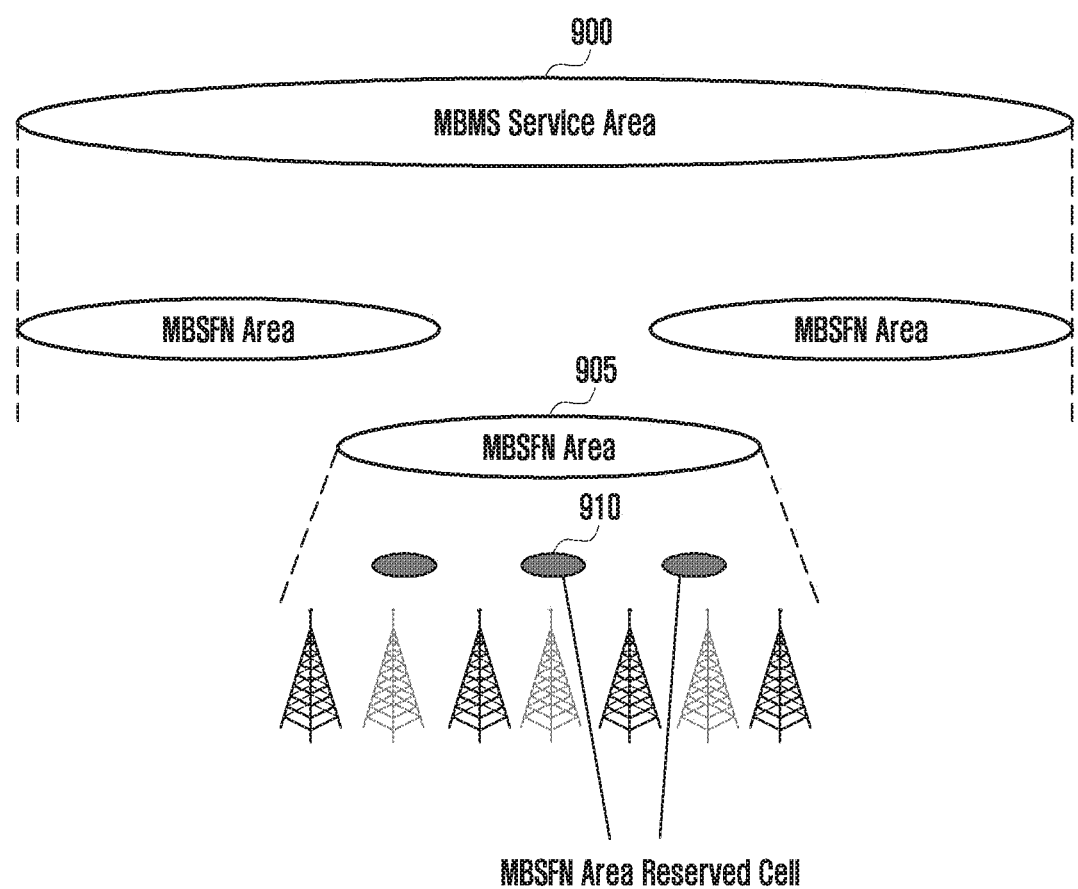
FIG. 9 is a view illustrating a conceptual diagram of multimedia broadcast multicast service (MBMS) according to an embodiment of the disclosure.

FIG. 9 is a view illustrating a conceptual diagram of MBMS according to an embodiment of the disclosure.

Referring to FIG. 9, an MBMS service area 900 is a network area composed of a plurality of base stations capable of performing MBSFN transmission. An MBSFN Area 905 is a network area composed of several cells integrated for MBSFN transmission, and all cells in the MBSFN Area are synchronized with MBSFN transmission. All cells except for MBSFN Area Reserved Cells 910 are used for MBSFN transmission. The MBSFN Area Reserved Cell 910 is a cell that is not used for MBSFN transmission, and can be transmitted for other purposes, but limited transmission power may be allowed for radio resources allocated for MBSFN transmission.

Figure 10:
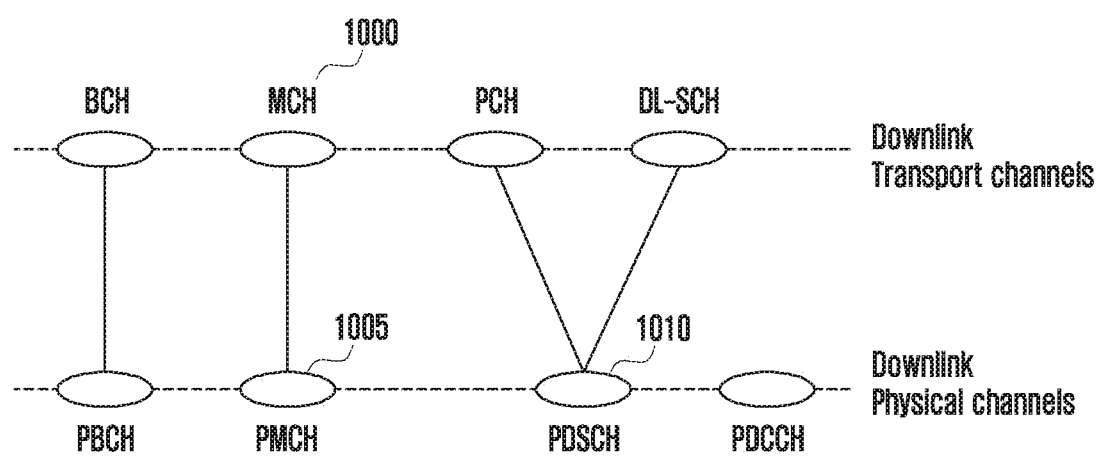
FIG. 10 is a view illustrating a downlink channel mapping diagram used for MBMS single frequency network (MBSFN) transmission according to an embodiment of the disclosure.

FIG. 10 is a view illustrating a downlink channel mapping diagram used for MBSFN transmission according to an embodiment of the disclosure.

Referring to FIG. 10, a multicast channel (MCH) 1000 is used between the MAC layer and the physical layer, and the MCH is mapped with a physical MCH (PMCH) 1005 of the physical layer. The purpose of unicast mainly uses a physical downlink shared channel (PDSCH) 1010.

Figure 11:
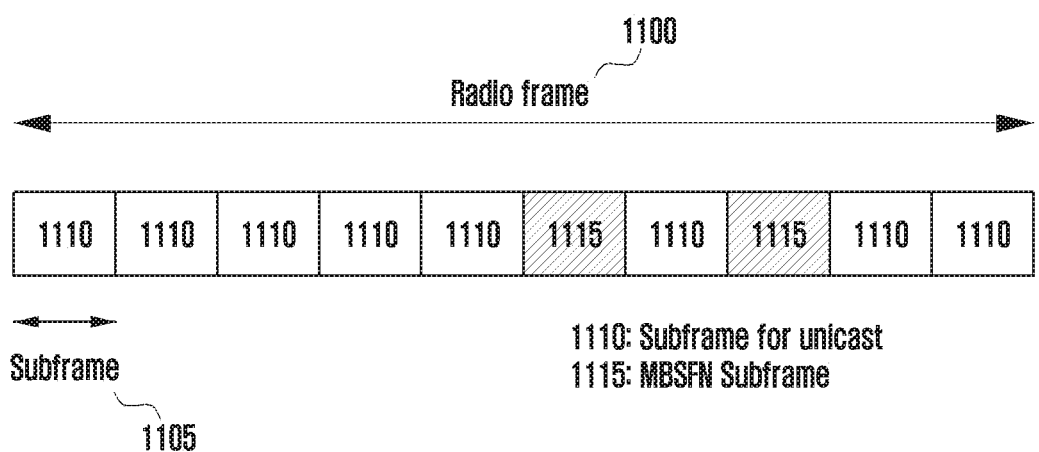
FIG. 11 is a view illustrating a structure of a downlink frame used in a long-term evolution (LTE) system according to an embodiment of the disclosure.

FIG. 11 is a view illustrating a structure of a downlink frame used in a wireless communication system according to an embodiment of the disclosure.

FIG. 11 illustrates a wireless communication system based on LTE, but the wireless communication system is not limited thereto. For example, the wireless communication system may also be applied to a 5G communication system, and in that case, a radio frame in the drawing may be matched to a frame and a subframe may be matched to a slot.

Referring to FIG. 11, a radio frame 1100 is composed of 10 subframes 1105, and each subframe has a 'normal subframe 1110' used for general data transmission/reception and an MBSFN subframe 1115' used for broadcasts. There is a difference between the normal subframe and MBSFN subframe in the number of orthogonal frequency division multiplexing (OFDM) symbols, the length of the cyclic prefix, and the structure and number of cell-specific reference signals (CRS). In the Rel-8 and Rel-9 systems, the MBSFN subframe was used only for the purpose of transmitting broadcast or multicast data.

However, with the evolution of the system, from LTE Rel-10, MBSFN subframes can be used not only for broadcast or multicast purposes, but also for unicast purposes. In LTE, in order to efficiently use the PDSCH, multi-antenna technology and transmission mode (TM) related to reference signal (RS) are classified and configured.

In LTE Rel-10, TM1 to TM9 exist. Each terminal has one TM for PDSCH transmission, and TM 8 is newly defined in Rel-9 and TM 9 is newly defined in Rel-10. TM 9 supports single user-multi-input multi-output (SU-MIMO) having a maximum of 8 ranks. TM 9 supports transmission of multiple layers, and enables transmission of up to 8 layers by using a Rel-10 demodulation reference signal (hereinafter referred to as "DMRS") during demodulation. Further, in the Rel-10 DMRS, a pre-coded DMRS is transmitted, but there is no need to inform the receiving end of the corresponding precoder index. In addition, to support TM 9, the downlink control information (hereinafter referred to as "DCI") format 2C has been newly defined in Rel-10. It is necessary to note that the terminals prior to Rel-10 do not attempt decoding in the MBSFN subframe. Therefore, allowing all terminals to attempt decoding in the MBSFN subframe leads to an upgrade request from the terminal of the previous release. In the disclosure, instead of allowing all terminals to receive unicast data in an MBSFN subframe, the function is applied only to terminals requiring the above function, for example, high-speed data communication. Among the aforementioned TMs, TM 9 in particular is a transmission mode that maximizes transmission efficiency by using multiple antennas.

For example, the base station may configure TM 9 to a terminal that needs to increase data throughput by receiving unicast data even in the MBSFN subframe, and only the terminal configured with TM 9 can receive unicast data in the MBSFN subframe.

For unicast data transmission and reception, in the LTE system, the physical downlink control channel (PDCCH) informs of where data transmission and reception actually occur, and the PDSCH transmits actual data. Before receiving actual data, the terminal should determine whether there is resource allocation information allocated to the terminal in the PDCCH. The MBSFN obtains resource allocation information through a somewhat more complex process. The base station informs the terminal of the transmission location of the multicast control channel (MCCH) for each MBSFN Area provided by the cell through broadcast information SIB13. The MCCH includes resource allocation information for the MBSFN, and the terminal may decode the MCCH to determine the transmission position of the MBSFN subframe. The reason why the MBMS provides resource allocation information through a method different from the unicast is that the MBMS should be able to be provided to a terminal in a standby mode as well according to the related art. Accordingly, the transmission position of the control channel MCCH is informed of by broadcast information SIB13.

Figure 12A:
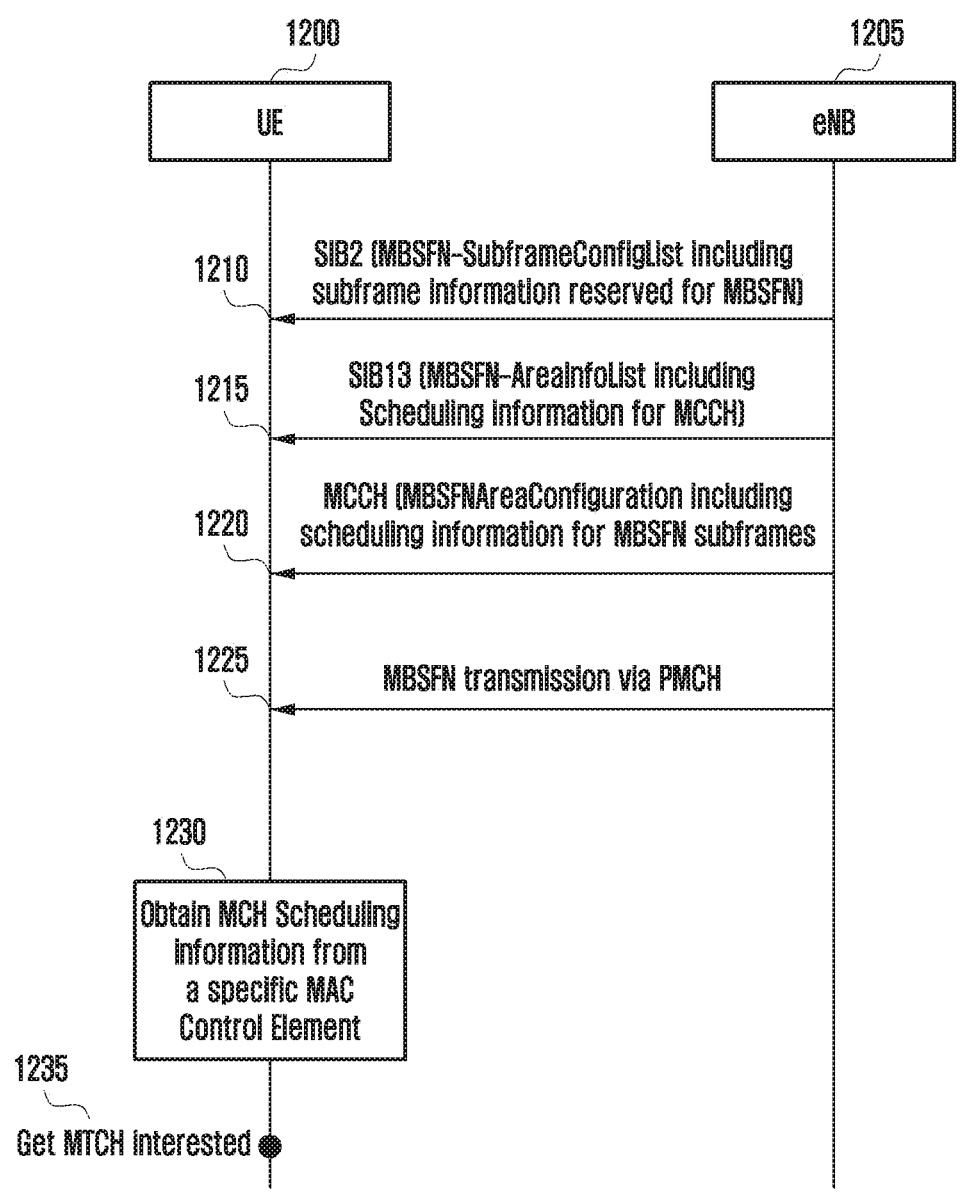
FIG. 12A is a view for explaining a process for receiving an MBSFN by a terminal according to an embodiment of the disclosure.

FIG. 12A is a view for explaining a process for receiving an MBSFN by a terminal according to an embodiment of the disclosure.

Referring to FIG. 12A, a terminal 1200 receives SIB2 from a base station 1205 in operation 1210. In the MBSFN-SubframeConfigList IE of SIB2, subframes that can be used for MBSFN transmission purposes are indicated. The MBSFN-SubframeConfigList IE includes the MBSFN-SubframeConfig IE, and indicates which subframe of which radio frame can be the MBSFN subframe. The table below is a configuration table of MBSFN-SubframeConfig IE.

The MBSFN-SubframeConfigList IE may further include radioframeAllocationPeriod, radioframeAllocationOffset, and subframeAllocation information.

The radioFrameAllocationPeriod and radioFrameAllocationOffset are used to indicate a radio frame having an MBSFN subframe, and a radio frame satisfying the formula SFN mod radioFrameAllocationPeriod=radioFrameAllocationOffset has an MBSFN subframe. SFN is a system frame number and indicates a radio frame number. SFN has a range of 0 to 1023 and is repeated.

The subframeAllocation indicates which subframe is the MBSFN subframe in the radio frame indicated by the above equation. It can be indicated in units of one radio frame or units of four radio frames. When using one radio frame unit, it is indicated in oneFrame IE. The MBSFN subframe may exist among 1st, 2nd, 3rd, 6th, 7th, and 8th subframes among a total of 10 subframes within one radio frame. Therefore, oneFrame IE indicates the MBSFN subframe among the subframes listed above using 6 bits. When using four radio frame units, it is indicated in the fourFrames IE. In order to cover four radio frames, a total of 24 bits are used to indicate an MBSFN subframe among the subframes listed above for each radio frame. Accordingly, the terminal can accurately know the subframe that can be the MBSFN subframe by using the MBSFN-SubframeConfigList IE.

If the terminal 1200 wants to receive MBSFN, the terminal 1200 receives the SIB13 from the base station 1205 in operation 1215. The MBSFN-AreaInfoList IE of SIB13 includes location information for transmitting an MCCH for each MBSFN Area provided by the cell, and the terminal receives the MCCH using the information in operation 1220. The location of the resource used for MBSFN transmission is indicated to MBSFNAreaConfiguration IE of the MCCH, and the terminal receives the MBSFN subframe in operation 1225 using this information. In operation 1230, the terminal acquires a location of an MBSFN subframe through which a desired multicast traffic channel (MTCH) is transmitted in the MCH scheduling information MAC CE, which is one of the MAC control elements (MAC CE) of the received MAC protocol data unit (PDU). The terminal decodes the desired MTCH in operation 1235 using the MCH scheduling information.

An MBMS described below, as the name suggests, refers to a multimedia broadcast multicast service, and MBSFN refers to a network that provides one MBMS service by synchronizing multiple cells in the MBMS. In the description of the disclosure, MBMS and MBSFN may be mixed.

The MBSFN subframe may be composed of a non-MBSFN region and an MBSFN region. This is because a non-MBSFN area is required for periodic transmission of control information (PDCCH, cell-specific reference signal) even in the MBSFN subframe.

When subcarrier spacing is $\Delta f$, the first 1 or 2 OFDM symbols may be used in the non-MB SFN region in the MBSFN subframe with $\Delta f=15$ kHz.

In the non-MBSFN area, a PDCCH, a physical hybrid automatic repeat request (ARQ) indicator channel (PHICH), a cell-specific reference signal, etc. may be transmitted, and a normal CP may be used.

In the MBSFN region, a PMCH may be transmitted, and an extended CP may be used for the PMCH. When using the extended CP, one subframe may be composed of 12 symbols.

For example, if one normal CP is used in an MBSFN subframe, 11 extended CPs may be used. As another example, if two normal CPs are used, 10 extended CPs may be used.

However, as in the non-MBSFN region of the MBSFN subframe and the MBSFN area, when the normal CP and the extended CP are mixed, a gap may be issued by the length of the normal CP. That is, when a normal CP and an extended CP are mixed, the length of a subframe defined in the standard may not be met. In this case, a zero padding operation may be required to fill the gap.

Examples of the zero padding length required to match the length of the subframe, that is, to match the length of the subframe defined in the standard, are as follows.

An example of the zero padding length when one normal CP is used and 11 extended CPs are used in the MBSFN subframe is as follows.

TABLE 1

| CP mode | | | Sym # | | | | | | | | | | |
|---|---|---|---|---|---|---|---|---|---|---|---|---|---|
| | 0 | zeros | 1 | 2 | 3 | 4 | 5 | 6 | 7 | 8 | 9 | 10 | 11 |
| CP mode | NCP | ECP-NCP#0 | ECP | ECP | ECP | ECP | ECP | ECP | ECP | ECP | ECP | ECP | ECP |

An example of the zero padding length when two normal CPs are used and 10 extended CPs are used in an MBSFN subframe is as follows.

TABLE 2

| | | | Sym # | | | | | | | | | |
|---|---|---|---|---|---|---|---|---|---|---|---|---|
| 0 | 1 | zeros | 2 | 3 | 4 | 5 | 6 | 7 | 8 | 9 | 10 | 11 |
| CP mode NCP | NCP | 2*ECP - NCP#0 - NCP#1 | ECP | ECP | ECP | ECP | ECP | ECP | ECP | ECP | ECP | ECP |

As described above, in O-RAN, standardization work for lower layer function split is in progress.

The zero padding operation by interchangeably using (mixing) the normal CP and the extended CP operates after the iFFT and CP addition block, and the operation is performed in the RU in the categories of both category A and category B of lower layer function separation.

Figure 12B:
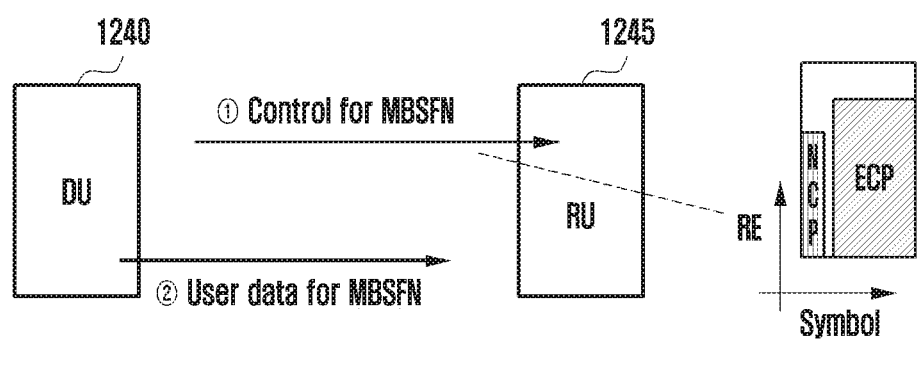
FIG. 12B is a view illustrating a process of performing a zero padding operation in an RU by separating a lower layer function according to Option 7-2 in an O-RAN according to an embodiment of the disclosure.

FIG. 12B is a view illustrating a process of performing a zero padding operation in an RU by separating a lower layer function according to Option 7-2 in an O-RAN according to an embodiment of the disclosure.

Referring to FIG. 12B, a DU 1240 transmits control information for MBSFN and user data for MBSFN to an RU 1245. In this case, the control information for the MBSFN may include scheduling information for receiving user data for the MBSFN.

In this case, the control information transmitted from the DU 1210 to the RU 1245 should be concise in the control information itself and the configuration, and the use of resources for processing control information should be small.

In the disclosure, a method of concisely configuring control information is proposed.

Figure 13:
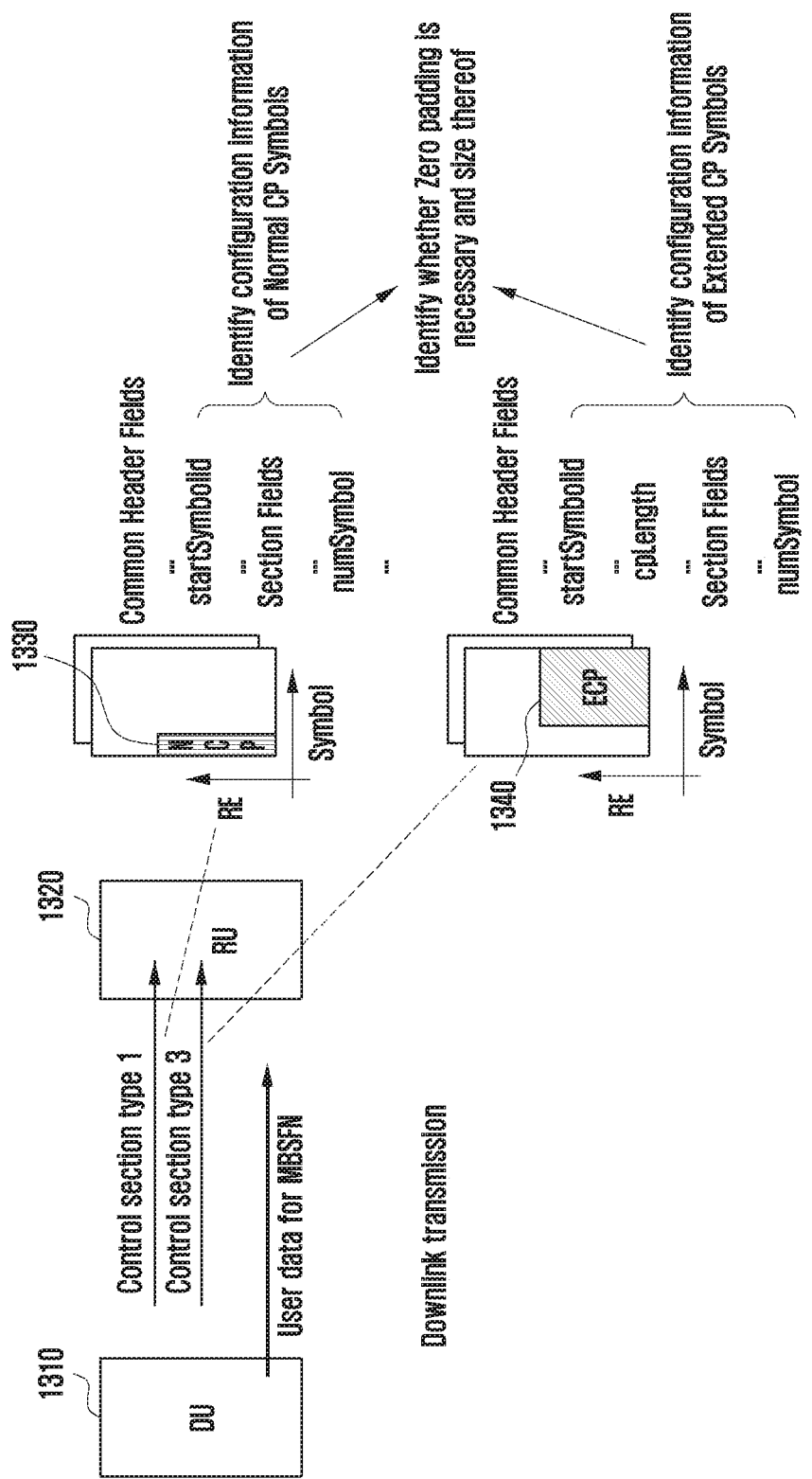
FIG. 13 is a view illustrating a process in which a DU transfers control information and data to an RU using a C-plane message defined in an O-RAN according to an embodiment of the disclosure.

FIG. 13 is a view illustrating a process in which a DU transfers control information and data to an RU using a C-plane message defined in an O-RAN according to an embodiment of the disclosure.

Referring to FIG. 13, control information transmitted from a DU 1310 to an RU 1320 is referred to as a C-plane message, which can be classified into a section type described in FIG. 5. In the disclosure, the C-plane message may be interchangeably referred to as a C-plane type, control message, control information, control command, and the like.

In the C-plane message, a type used may be classified according to a CP type of a symbol. For example, the DU 1310 may transmit a C-plane message according to section type 1 to the RU 1320 in the case of normal CP Symbols, and transmit a C-plane message according to Section type 3 to the RU 1320 in the case of extended CP Symbols.

That is, in the case of MFSFN subframe, the DU 1310 may transmit C-plane messages of one or more section types to the RU 1320.

Each C-plane message includes scheduling information independently. Accordingly, it is not possible to determine the association with information about other C-plane messages using one C-plane message.

Accordingly, the RU 1320 may determine that a symbol 1330 using the normal CP and a symbol 1340 using the extended CP are simultaneously scheduled after identifying the symbol configuration information for one subframe, based on two C-plane messages according to section type 1 (may consist of more than one) and a C-plane message according to section type 3 (more than 1 may be configured).

Specifically, the RU 1320 may analyze symbol configuration information from the received C-plane message according to section type 1 and the C-plane message according to section type 3. In addition, the RU 1320 may recognize that the corresponding subframe is an MBSFN subframe and that zero padding is required through the symbol configuration information of the subframe.

Thereafter, since the number of samples is determined by the FFP size, the RU 1320 can determine the zero padding size, based on information on the number of symbols acquired in control section type 1 and information on the FFT size.

However, according to the above method, since the RU 1320 needs to analyze control information of different control section types, processing time may be delayed and complexity may increase. For example, in order to determine the MBSFN subframe by combining the symbol configuration information of the subframe, the RU 1320 needs to receive and process different control section types, so additional processing time is required. This may mean that the determination is delayed because it is possible to determine whether the subframe is an MBSFN subframe after all control section types (e.g., scheduling information) of one subframe are processed. In addition, the RU 1320 may increase the complexity due to logic for determining the MBSFN subframe.

Accordingly, the disclosure proposes a method in which the DU of the base station efficiently transmits or transfers information on the MBSFN subframe configuration to the RU of the base station. Specifically, the disclosure proposes a method for reducing the processing load and complexity of the RU for analyzing whether the RU needs zero padding and, if necessary, the zero padding size.

Figure 14:
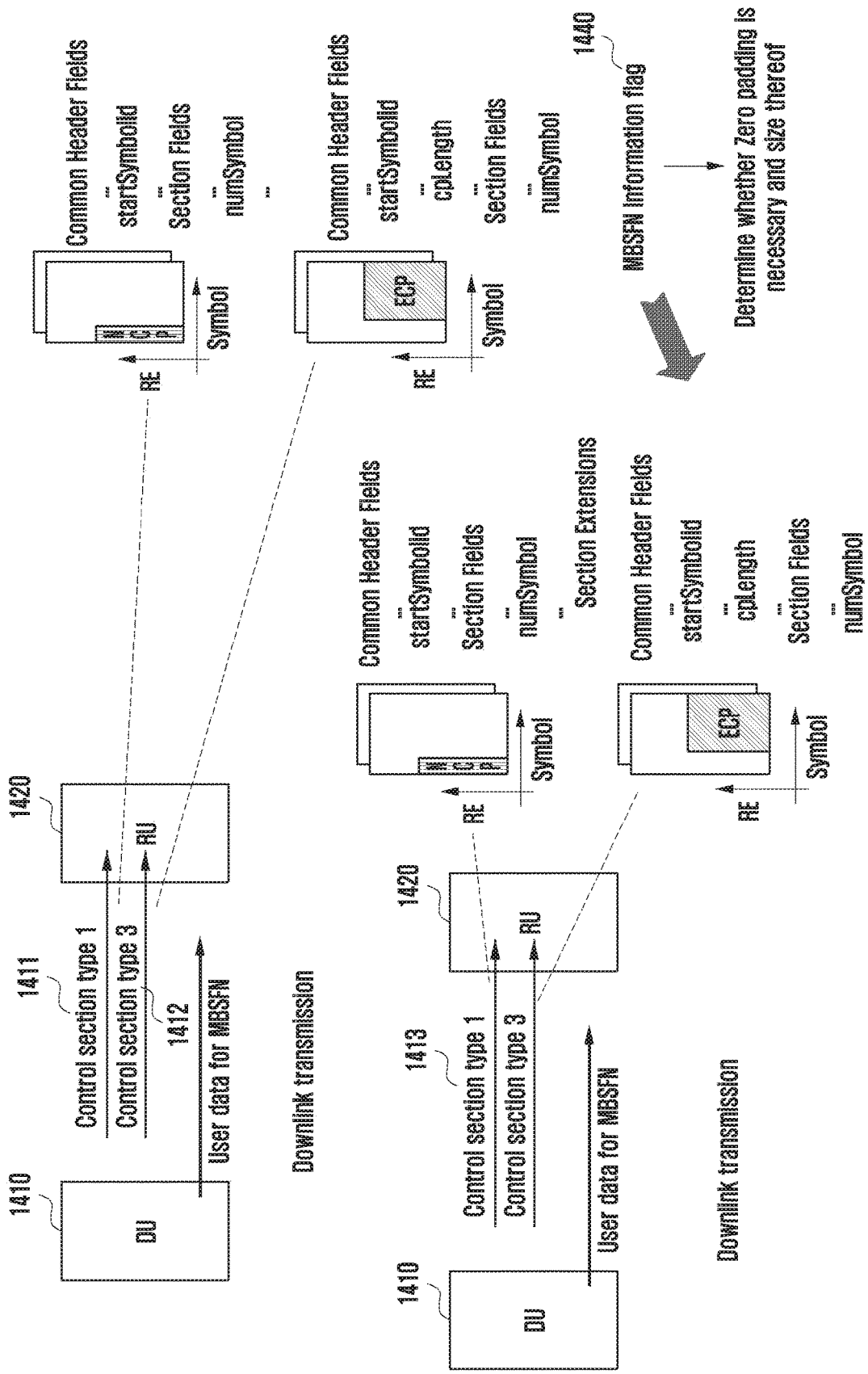
FIG. 14 is a view illustrating a method of transmitting a C-plane message from a DU to an RU according to an embodiment of the disclosure.

FIG. 14 is a view illustrating a method of transmitting a C-plane message from a DU to an RU according to an embodiment of the disclosure.

Referring to FIGS. 13 and 14, a DU 1410 transmits a C-plane message 1411 according to the section type 1 and a C-plane message 1412 according to the section type 3 according to the related art. Then, based on the two C-plane messages, an RU 1420 identifies symbol configuration information for one subframe, and then may determine that the symbol 1330 using the normal CP and the symbol 1340 using the extended CP are simultaneously scheduled. Thereafter, the RU 1420 determines a zero padding size, based on information on the number of symbols acquired in the control section type 1 and information on the FFT size.

MBSFN-related information (or flag) 1440 is newly defined in a C-plane message 1413 according to the section type 1. The MBSFN-related information 1440 may include information that zero padding is required because a corresponding subframe is an MBSFN subframe, and information on the number of symbols in which the normal CP is used.

For example, the MBSFN-related information may include information indicating whether CP types are mixed according to the MBSFN subframe configuration, and information on the number of symbols using the normal CP.

Alternatively, the MBSFN-related information may include a flag indicating whether to mix CP types according to the MBSFN subframe configuration, and a flag for the number of symbols using the normal CP.

Alternatively, the MBSFN-related information may include a flag indicating whether to mix CP types according to the MBSFN subframe configuration, a flag for the number of symbols using the normal CP, and the number of zero padding samples (or, zero padding size).

The state in which different CP types are mixed can be known in the upper layer, and information indicating this can also be generated in the upper layer. For example, the MBSFN subframe configuration may be information already determined in an upper layer, and information to be transmitted to the terminal may be already generated. Since the C-Plane message is generated according to the configuration of the MBSFN subframe, additional information may also be inserted when the C-Plane message is generated.

Accordingly, the DU 1410 may generate the MBSFN information related information 1440 and transmit the same to the RU 1420 through a C-plane message. Then, even if the RU 1420 does not refer to all C-plane messages for a specific subframe, it is possible to determine whether zero padding is required and determine the zero padding size by using MBSFN-related information included in the C-plane message by specific generation.

Alternatively, even if the RU 1420 does not refer to all C-plane messages for a specific subframe, the RU 1420 may identify whether zero padding is needed and the zero padding size using only the MBSFN-related information included in the C-plane message by specific generation.

In an embodiment for configuring the MBSFN-related information in an O-RAN C-plane message, the disclosure proposes a method for configuring in section extension fields, a method for configuring in common header fields, and a method for configuring in section fields.

FIG. 15A is a view illustrating a method of configuring MBSFN related information in a section extension field in a C-plane message according to an embodiment of the disclosure.

As described above, FIG. 7 illustrates a C-plane message according to type 1, and FIG. 8 illustrates a C-plane message according to section type 3. Each C-plane message includes a section extension field.

The DU according to an embodiment of the disclosure may insert MBSFN related information into a C-plane message using the section extension field and transmit the same to the RU.

Referring to FIG. 15A a method of inserting mixedCpFlag information 1510 and mixedCpIdx information 1520 into section extension fields as a method of inserting MBSFN-related information into a section extension field.

The mixedCpFlag information 1510 may indicate whether a normal CP and an extended CP are mixed in a subframe. This may be indicated as 0 or 1, and when configured as 0, it indicates that the normal CP and the extended CP are not mixed, and when configured as 1, it may indicate that the normal CP and the extended CP are mixed. However, it should be noted that the meaning of configuring 0 and 1 is only an example, and it is not necessarily limited to this. In addition, mixedCpF lag=0 (non-mixed) may not be used.

The mixedCpIdx information 1520 may indicate the number of normal CPs within a subframe. This may be indicated as 0 or 1, and when configured as 0, it may indicate that the number of normal CPs is 1, and when configured as 1, it may indicate that the number of normal CPs is 2. Likewise, it should be noted that the meaning of the configuration of 0 and 1 is only an example, and it is not necessarily limited thereto.

Figure 15B:
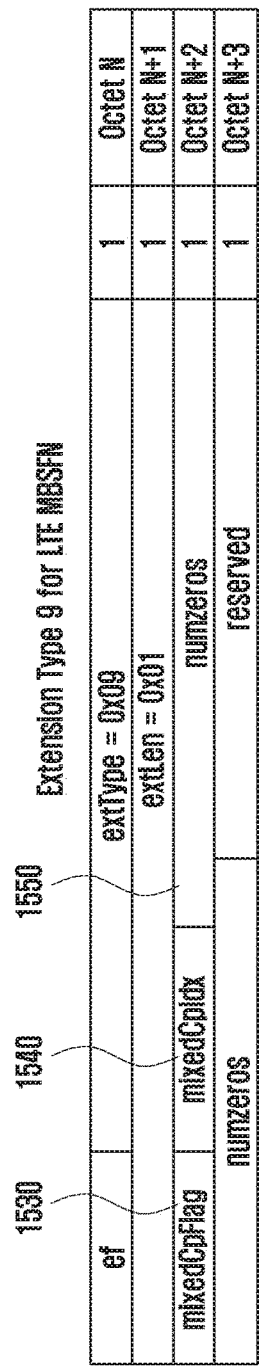
FIG. 15B is a view illustrating a method of configuring MBSFN related information in a section extension field in a C-plane message according to an embodiment of the disclosure.

Referring to FIG. 15B a method of inserting mixedCpFlag information 1530, mixedCpIdx information 1540, and numzeros information 1550 into section extension fields as a method of inserting MBSFN-related information into a section extension field.

The mixedCpFlag information 1530 may indicate whether a normal CP and an extended CP are mixed in a subframe. This may be indicated as 0 or 1, and when configured as 0, it indicates that normal CP and extended CP are not mixed, and when configured as 1, it may indicate that normal CP and extended CP are mixed. However, it should be noted that the meaning of configuring 0 and 1 is only an example, and it is not necessarily limited thereto. Also, mixedCpFlag=0 (non-mixed) may not be used.

The mixedCpIdx information 1540 may indicate the number of Normal CPs in a subframe. This may be indicated as 0 or 1, and when configured as 0, it may indicate that the number of normal CPs is 1, and when configured as 1, it may indicate that the number of normal CPs is 2. Likewise, it should be noted that the meaning of the configuring of 0 and 1 is only an example, and it is not necessarily limited thereto.

The numzeros information 1550 may indicate the number of zero padding samples (or zero padding size) in a subframe. This may be indicated based on the 10 bits field length, which may indicate the number of maximum 1024 zero padding samples. However, it should be noted that the meaning of the 10-bit field length setting is only an example, and it is not necessarily limited to this.

The embodiment illustrated in FIG. 15 can be applied to both a C-plane message according to section type 1 and a C-plane message according to section type 3.

Figure 16:
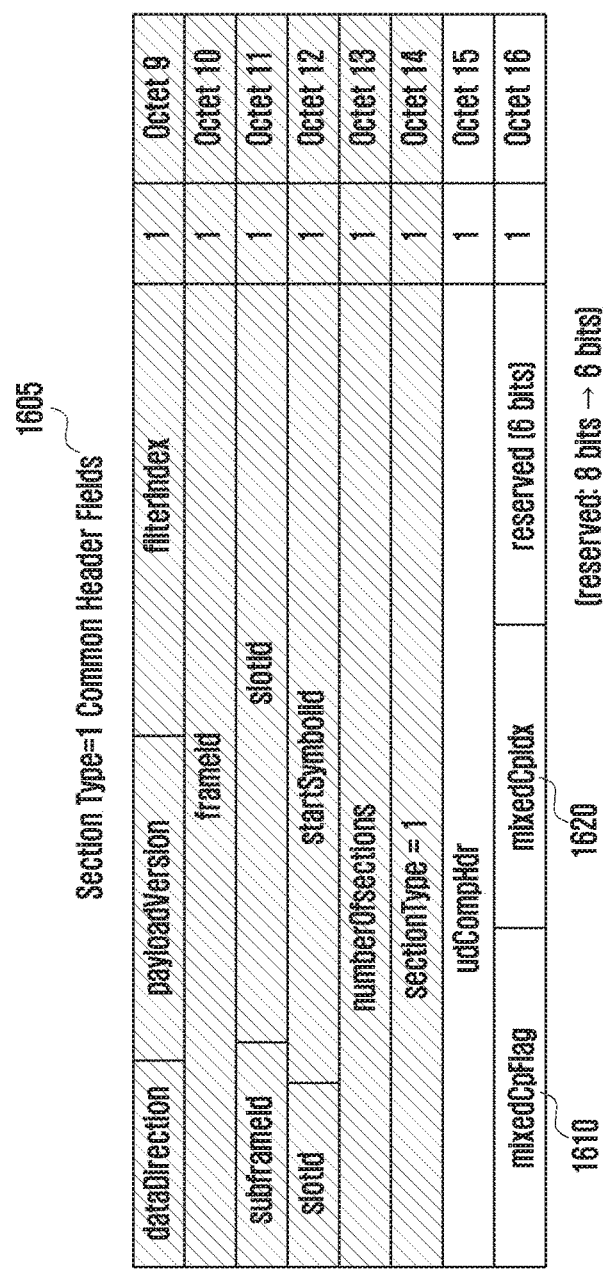
FIG. 16 is a view illustrating a method of configuring MBSFN-related information in common header fields according to an embodiment of the disclosure.

FIG. 16 is a view illustrating a method of configuring MBSFN-related information in common header fields according to an embodiment of the disclosure.

Referring to FIG. 16, the C-plane message according to section type 1 may include a common header field 1605. The common header field 1605 includes reserved 8 bits, of which mixedCpFlag information 1610 and mixedCpIdx information 1620 may be configured in 2 bits.

The mixedCpFlag information 1610 may indicate whether a normal CP and an extended CP are mixed in a subframe. This may be indicated as 0 or 1, and when configured as 0, it may indicate that the normal CP and the extended CP are not mixed, and when configured as 1, it may indicate that the normal CP and the extended CP are mixed, or vice versa.

The mixedCpIdx information 1620 may indicate the number of Normal CPs within a subframe. This may be indicated as 0 or 1, and when configured as 0, it may indicate that the number of normal CPs is 1, and when configured as 1, it may indicate that the number of normal CPs is 2, or vice versa.

FIG. 17 is a view illustrating a method of configuring MBSFN-related information in a section field according to an embodiment of the disclosure.

Referring to FIG. 17, the C-plane message according to section type 3 may include a section field 1705. The section field 1705 includes reserved 8 bits, of which mixedCpFlag information 1710 and mixedCpIdx information 1720 may be configured in 2 bits.

The mixedCpFlag information 1710 may indicate whether a normal CP and an extended CP are mixed in a subframe. This may be indicated as 0 or 1, and when configured as 0, it may indicate that the normal CP and the extended CP are not mixed, and when configured as 1, it may indicate that the normal CP and the extended CP are mixed, or vice versa.

The mixedCpIdx information 1720 may indicate the number of normal CPs within a subframe. This may be indicated as 0 or 1, and when configured as 0, it may indicate that the number of normal CPs is 1, and when configured as 1, it may indicate that the number of normal CPs is 2, or vice versa.

Figure 18A:
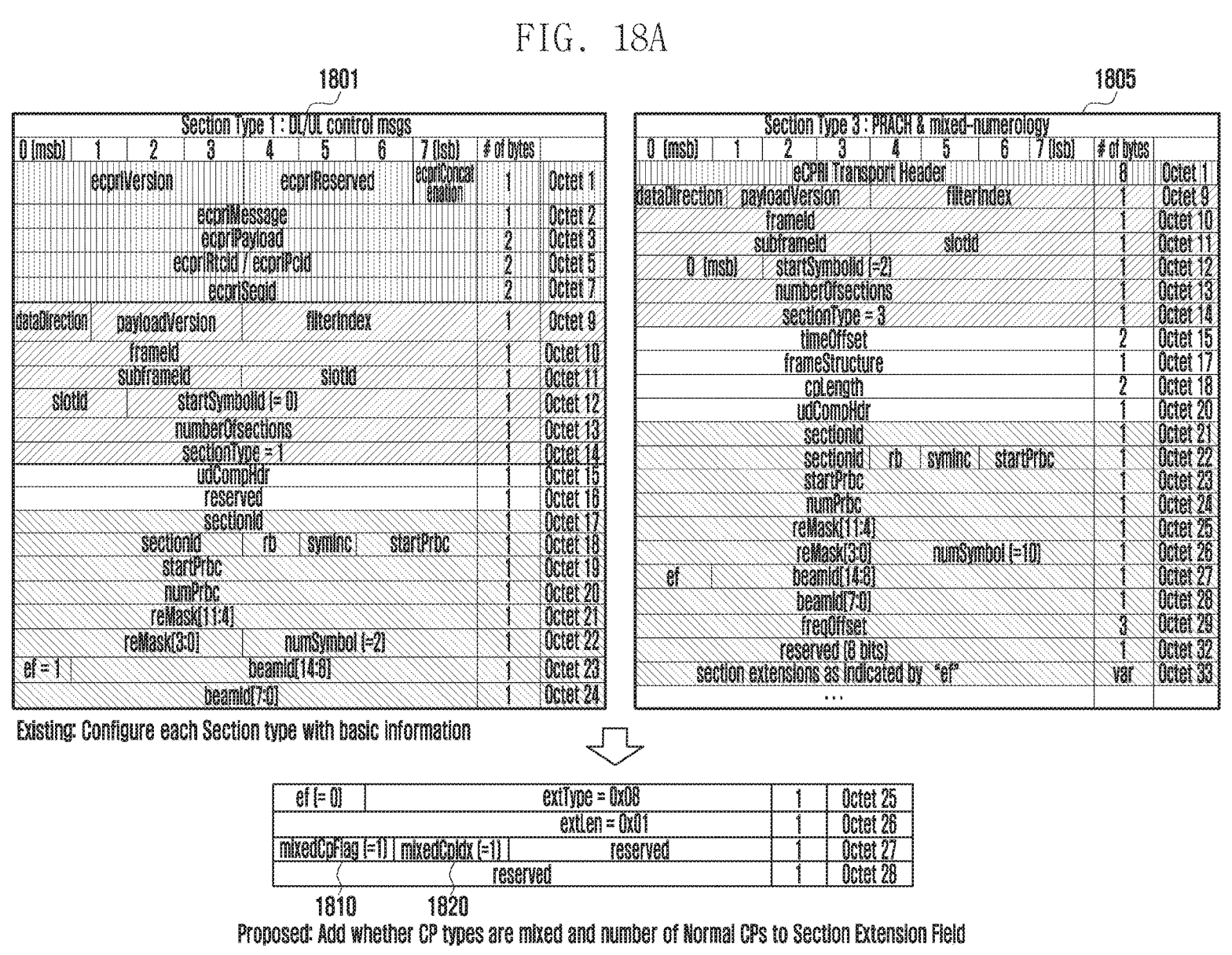
Figure 18B:
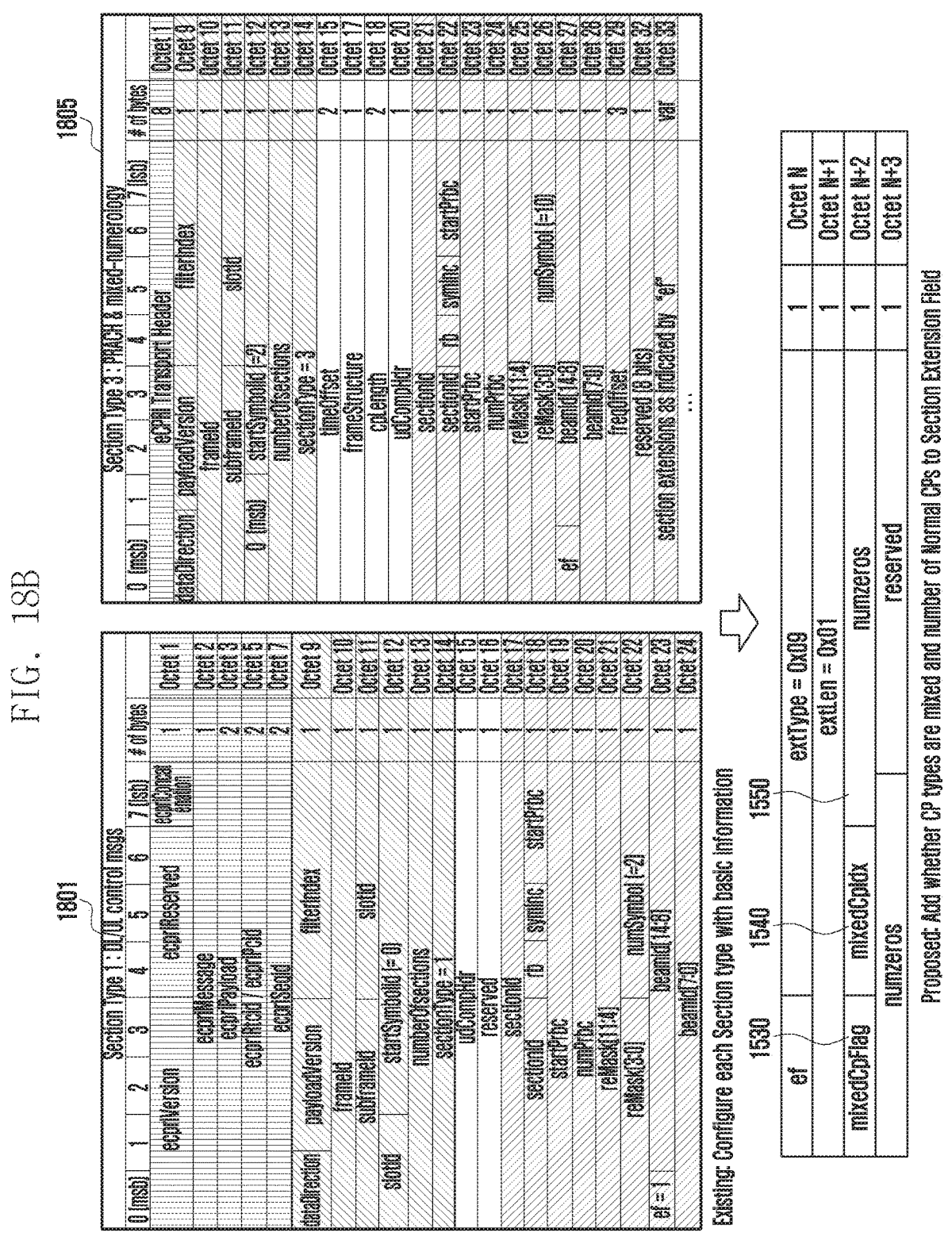

FIG. FIGS. 18A and 18B are views illustrating a method of configuring a C-plane message by a DU using a section extension field in a mixed CP type of LTE MBSFN according to an embodiment of the disclosure.

In FIGS. 18A and 18B, a situation in which two normal CP symbols are configured is exemplified and described.

As described above, the C-plane message may include a C-plane message 1801 according to the section type 1 and a C-plane message 1805 according to the section type 3.

A C-Plane message according to section type 1 may include information on a normal CP symbol, and a C-plane message according to section type 3 may include information on an extended CP symbol. Each C-Plane message may include scheduling information for one or more symbols. In the examples shown in FIGS. 18A and 18B, one C-plane message is configured for each section type, but the C-Plane message may be divided.

FIG. 18A illustrates a method of inserting MBSFN-related information into each section extension field of the C-plane message 1801 according to section type 1 and the C-plane message 1805 according to section type 3. The MBSFN-related information may include mixedCpFlag information 1810 and mixedCpIdx information 1820, and the configuration and meaning of each information are as described above.

FIG. 18B illustrates a method of inserting MBSFN-related information into the section extension fields of each of the C-plane message 1801 according to section type 1 and the C-plane message 1805 according to section type 3. The MBSFN-related information may include mixedCpF lag information 1830, mixedCpIdx information 1840, and numzeros information 1850, and the configuration and meaning of each piece of information are as described above.

According to an embodiment of the disclosure, a section extension field may be added at three positions of section type 1, section type 3, section type 1 and section type.

Figure 19:
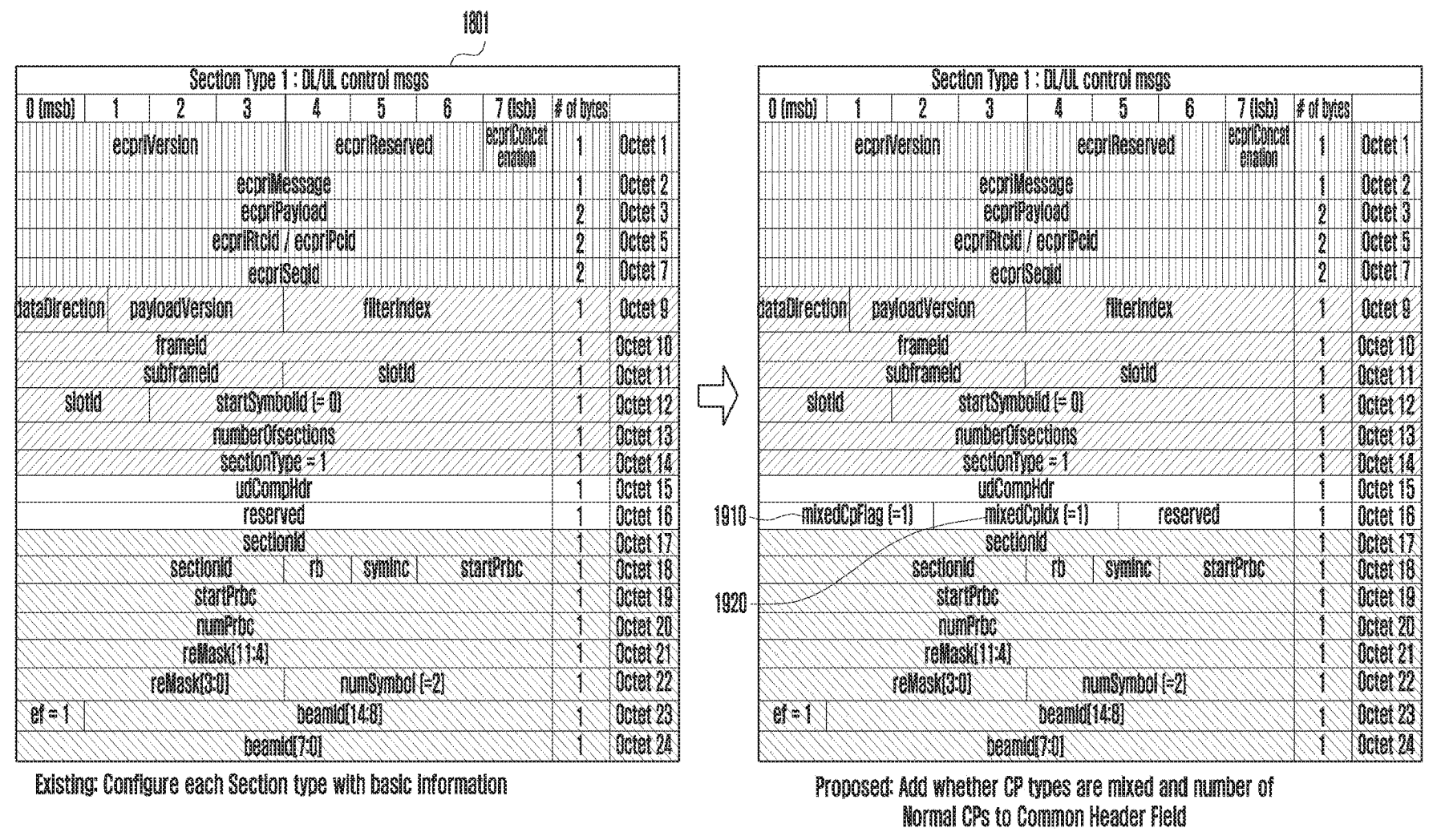

FIG. 19 is a view illustrating a method of configuring a C-Plane message by a DU using a common header field in a mixed CP type of LTE MBSFN according to an embodiment of the disclosure.

Referring to FIGS. 18A, 18B and 19, a method of configuring the C-plane message 1801 according to section type 1 when there are two normal CP symbols. As illustrated in FIG. 19, the common header field included in the C-plane message according to section type 1 includes reserved 8 bits, and the DU may configure mixedCpFlag information 1910 and mixedCpIdx information 1920 by using 2 bits thereof. The configuration of each information and its meaning are as described above.

Figure 20:
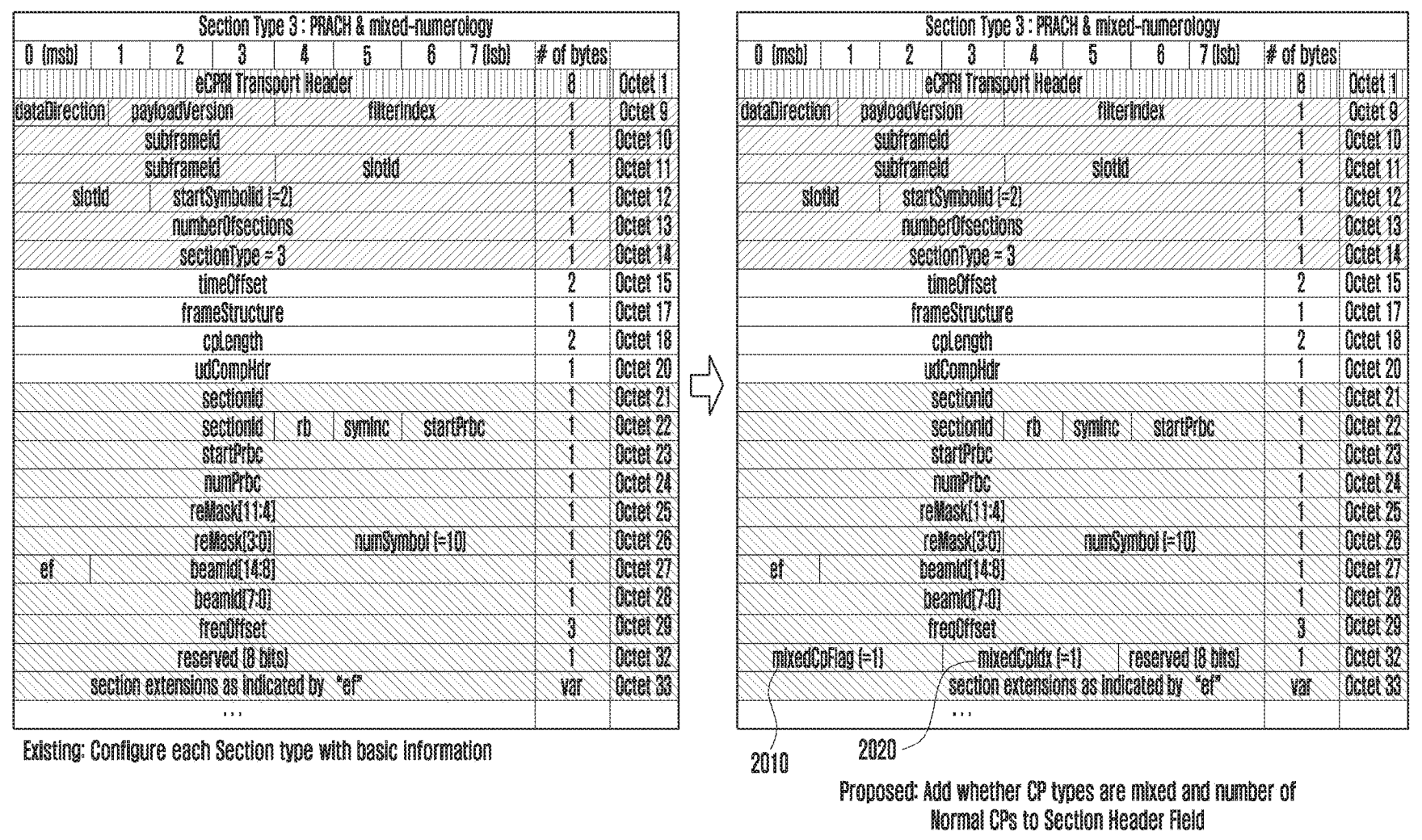

FIG. 20 is a view illustrating a method of configuring a C-Plane message by using a section field in a DU in a mixed CP type situation of LTE MBSFN according to an embodiment of the disclosure.

Referring to FIG. 20, a method is illustrated for configuring a C-plane message according to section type 3 when there are two normal CP symbols. As illustrated in FIG. 20, the section field included in the C-plane message according to section type 3 includes reserved 8 bits, and the DU may configure mixedCpFlag information 2010 and mixedCpIdx information 2020 using 2 bits thereof. The configuration of each information and its meaning are as described above.

FIG. 21 is a view illustrating examples in which an RU determines a zero padding size according to an embodiment of the disclosure.

FIG. 22 is another view illustrating an example in which an RU determines a zero padding size according to an embodiment of the disclosure.

Referring to FIGS. 21 and 22, the RU may analyze subframe configuration information, based on the C-plane message received from the DU. In an embodiment of the disclosure, it is possible to determine whether to perform zero padding, based on mixedCpF lag information and mixedCpIdx information included in the C-plane message.

For example, when mixedCpFlag information is configured as 0, since a normal CP and an extended CP are not mixed within a subframe, the RU may not perform the zero padding operation.

As another example, when mixedCpFlag information is configured as 1 and mixedCpIdx information is configured as 0, the RU may determine a zero padding size, based on the mixedCpFlag information, mixedCpIdx information, and FFT size as illustrated in FIG. 21. As can be seen in FIG. 21, since the number of samples of the OFDM symbol varies according to the FFT size, the zero padding size may be determined differently according to the FFT size.

For example, if the FFT size is 512, the length of symbol #0 using a normal CP is 552 samples, and the length of symbols using the remaining extended CP is 640 samples, so the zero padding size may be determined as 88 by the difference between the number of samples for a symbol using the extended CP and the number of samples for a symbol using the normal CP. When the FFT size is 1024, the zero padding size may be determined as 176, and when the FFT size is 2048, the zero padding size may be determined as 352. Zero padding is performed on a section between a symbol using a normal CP and a symbol using an extended CP, based on the determined size. Performing zero padding may mean that, for example, if the number of zero padding samples (or zero padding size) is 88, 0 is added by the length of 88 samples.

As another example, when mixedCpFlag information is configured as 1 and mixedCpIdx information is configured as 1, the RU may determine a zero padding size, based on the mixedCpFlag information, mixedCpIdx information, and FFT size as shown in FIG. 22. As can be seen in FIG. 22, since the number of samples varies according to the FFT size, the zero padding size may be determined differently according to the FFT size.

For example, when the FFT size is 512, the zero padding size may be determined as 180, when the FFT size is 1024, the zero padding size may be determined as 360, and when the FFT size is 2048, the zero padding size may be determined as 720.

In addition, the RU may analyze subframe configuration information, based on the C-plane message received from the DU. In an embodiment, whether to perform zero padding may be determined based on the mixedCpFlag information, mixedCpIdx information, and numzeros information included in the C-plane message.

For example, when the mixedCpFlag information is configured as 0, since normal CP and extended CP are not mixed in a subframe, the RU may not perform the zero padding operation.

As another example, when the mixedCpFlag information is configured as 1, the mixedCpIdx information is configured as 0, and the numzeros information is configured as 88 (=0001011000), the padding size may be determined to be 88 regardless of the FFT size in FIG. 21.

As another example, when the mixedCpFlag information is configured as 1, the mixedCpIdx information is configured as 0, and the numzeros information is configured as 176 (=0010110000), the padding size may be determined to be 176 regardless of the FFT size in FIG. 21.

Zero padding is performed on a section between a symbol using a normal CP and a symbol using an extended CP, based on the determined size. Performing zero padding may mean that, for example, if the number of zero padding samples (or the zero padding size) is 88, adding 0 as much as 88 samples length.

As another example, when the mixedCpFlag information is configured as 1 and the mixedCpIdx information is configured as 1, the RU may identify the zero padding size, based on the mixedCpF lag information, mixedCpIdx information, and numzeros information as shown in FIG. 22.

For example, when the numzeros information is 180, the zero padding size may be identified as 180, when the numzeros information is 360, the zero padding size may be identified as 360, and when the numzeros information is 720, the zero padding size may be identified as 720.

Figure 23:
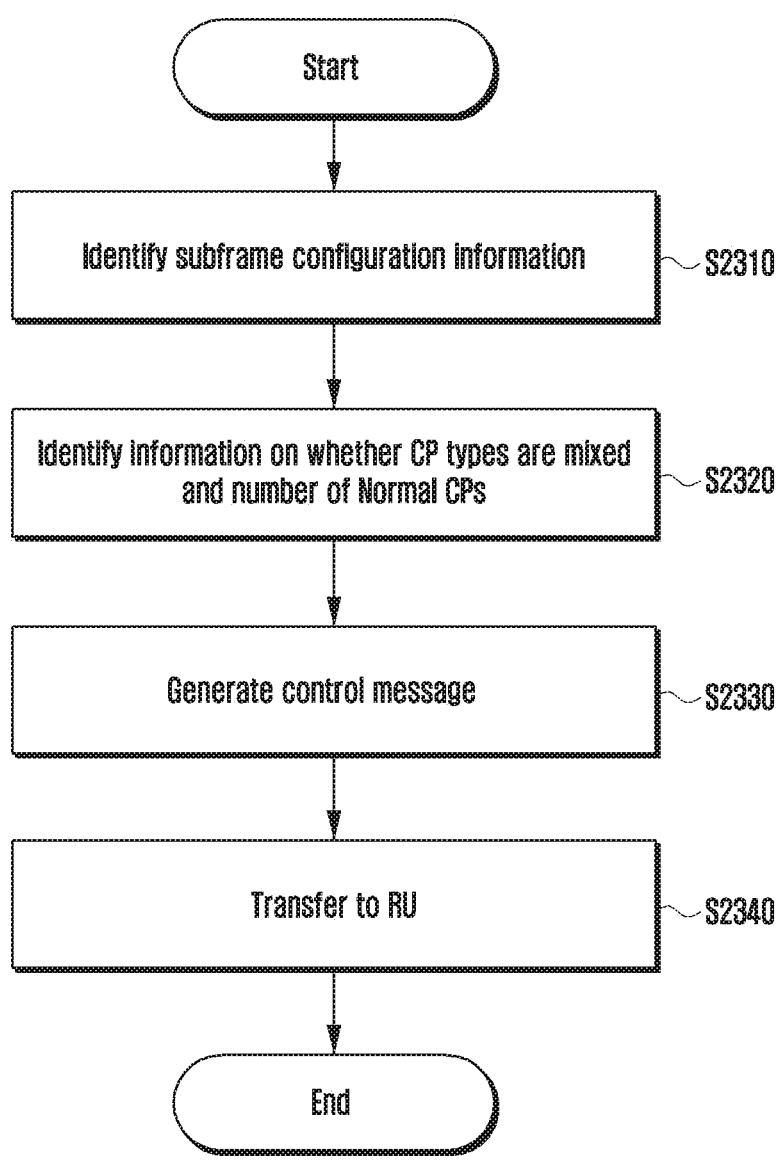
FIG. 23 is a flow chart illustrating an operation sequence of a DU device of a base station according to an embodiment of the disclosure.

FIG. 23 is a flow chart illustrating an operation sequence of a DU device of a base station according to an embodiment of the disclosure.

Referring to FIG. 23, the DU device of a base station may identify configuration information for a specific subframe in operation S2310. The DU device of the base station may identify information on whether a normal CP and an extended CP are mixed in the subframe, and if they are mixed, the DU device may identify information on the number of normal CPs in operation S2320, according to the identification result.

The DU device of the base station may generate a C-plane message (or control message) according to an embodiment of the disclosure in operation S2330. In this case, the C-plane message may include MBSFN-related information. In this case, the MBSFN-related information may include mixedCpFlag information indicating whether the normal CP and the extended CP are mixed in the subframe and mixedCpIdx information indicating the number of normal CPs in the subframe.

Alternatively, the MBSFN-related information may include a flag indicating whether CP types are mixed according to the MBSFN subframe configuration, a flag for the number of symbols using normal CP, and the number of zero padding samples (or zero padding size).

The MBSFN-related information may be configured using a section extension field in a C-plane message, configured using a common header field, or configured using a section field according to an embodiment.

In addition, the DU device of the base station may transmit the generated C-plane message to the RU in operation S2340.

Figure 24:
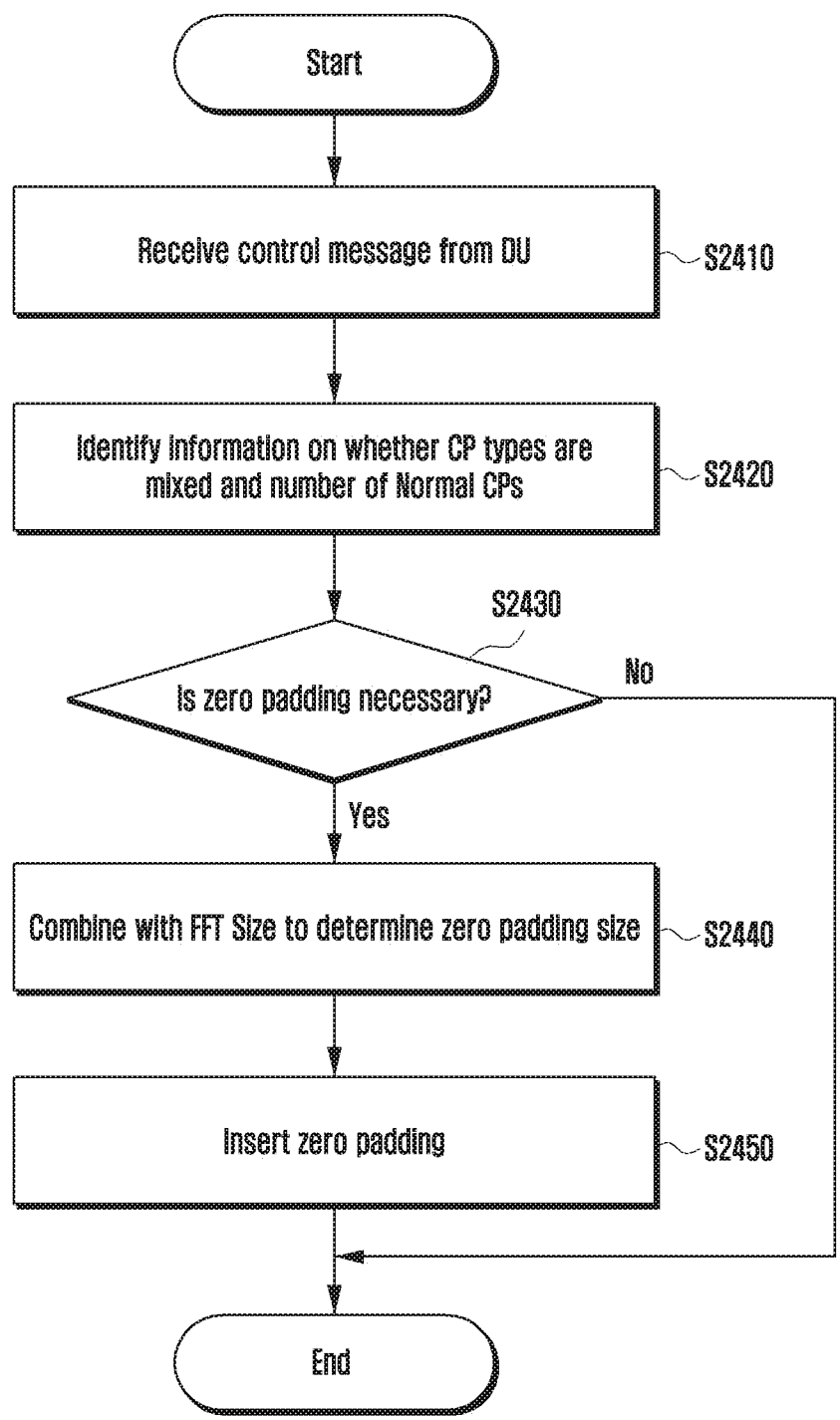
FIG. 24 is a flowchart illustrating an operation sequence of an RU device of a base station according to an embodiment of the disclosure.

FIG. 24 is a flowchart illustrating an operation sequence of an RU device of a base station according to an embodiment of the disclosure.

Referring to FIG. 24, the RU device of the base station may receive a C-plane message (or control message) from the DU device of the base station in operation S2410.

In addition, the RU device of the base station may check MBSFN-related information based on the C-plane message in operation S2420. In this case, the MBSFN-related information may include mixedCpFlag information indicating whether a normal CP and an extended CP are mixed in the subframe and mixedCpIdx information indicating the number of normal CPs in the subframe.

Alternatively, the MBSFN-related information includes a flag indicating whether CP types are mixed according to the MBSFN subframe configuration, a flag for the number of symbols using normal CP, and the number of zero padding samples (or zero padding size).

In addition, the RU device of the base station may determine whether zero padding is required in operation S2430, based on the result of the check. For example, if the normal CP and the extended CP are not mixed, it may be determined that zero padding is not required.

On the other hand, if the normal CP and the extended CP are mixed, the RU device of the base station may determine the zero padding size in operation S2440, based on the FFT size information and mixedCpIdx information indicating the number of normal CPs in the subframe. A specific example of determining the zero padding size is as illustrated in FIGS. 21 and 22.

In operation S2450, the RU device of the base station inserts zero padding by the determined zero padding size.

Figure 25:
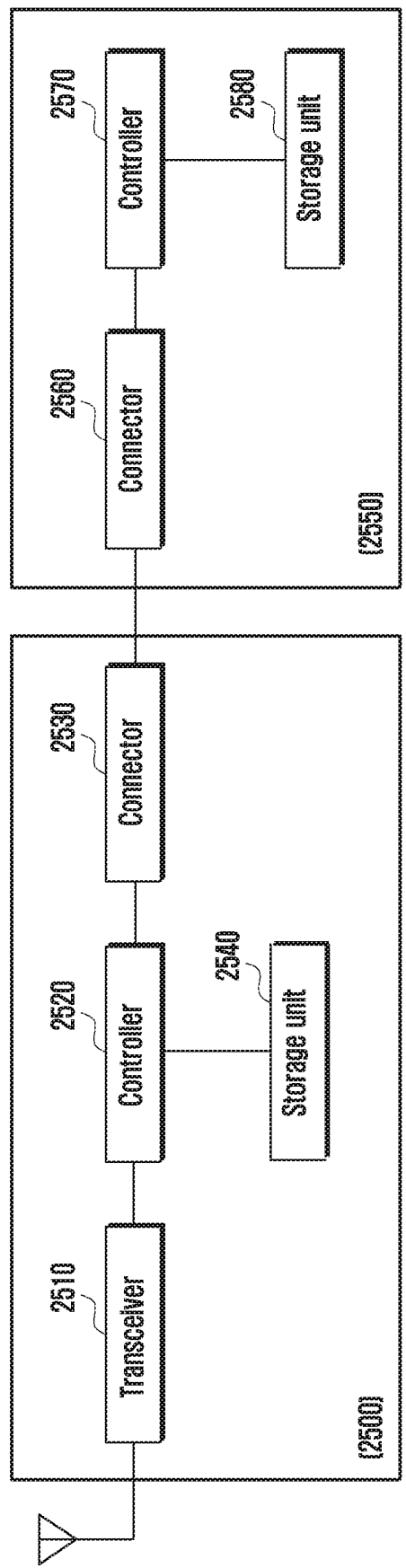
FIG. 25 is a block diagram illustrating an internal structure of an RU device of a base station and a DU device of the base station according to an embodiment of the disclosure.

FIG. 25 is a block diagram illustrating an internal structure of an RU device of a base station and a DU device of the base station capable of performing according to an embodiment of the disclosure.

Referring to FIG. 25, an RU device 2500 of the base station includes a transceiver 2510, at least one processor and/or controller 2520, a connector 2530, and a storage unit 2540. However, the components of the RU device 2500 of the base station are not limited to the above-described example, and for example, the RU device 2500 of the base station may include more or fewer components than the illustrated components. In addition, the transceiver 2510, the storage unit 2540, and the controller 2520 may be implemented in the form of a single chip.

The transceiver 2510 may transmit and receive signals to and from a terminal. Here, the signal may include control information and data. To this end, the transceiver 2510 may include an RF transmitter that upconverts and amplifies a frequency of a transmitted signal, and an RF receiver that amplifies a received signal with low noise and downconverts a frequency. However, this is only an embodiment of the transceiver 2510, and components of the transceiver 2510 are not limited to the RF transmitter and the RF receiver. In addition, the transceiver 2510 may receive a signal through a wireless channel, output the same to the controller 2520, and transmit the signal output from the controller 2520 through a wireless channel. In addition, the transceiver 2510 may separately include an RF transceiver for an LTE system and an RF transceiver for an NR system, or may perform physical layer processing of LTE and NR with one transceiver.

The storage unit 2540 may store programs and data necessary for the operation of the RU device of the base station. In addition, the storage unit 2540 may store control information or data included in signals transmitted and received by the RU device of the base station. The storage unit 2540 may be composed of a storage medium such as read only memory (ROM), random access memory (RAM), hard disk, compact disc ROM (CD-ROM), and digital versatile disc (DVD), or a combination of storage media. Also, there may be a plurality of storage units 2540.

The controller 2520 may control a series of processes so that the RU device 2500 of the base station can operate according to the above-described embodiment. For example, the controller 2520 may transmit/receive an LTE or NR signal to and from the terminal according to a C-plane message and a U-plane message received from a DU device 2550 of the base station through the connector 2530. There may be a plurality of controllers 2520, and the controller 2520 may perform a component control operation of the RU device 2500 of the base station by executing a program stored in the storage unit 2540.

The controller 2520 according to an embodiment may control to receive a control message including multimedia broadcast multicast service single frequency network (MBSFN)-related information for a subframe from a digital unit of a base station through a connection unit 2530 to be described later, and control to perform zero padding in the subframe, based on the MBSFN-related information. In addition, the controller 2520 may determine a zero padding size, based on a Fast Fourier Transform (FFT) size, and control to perform the zero padding based on the determined zero padding size.

The connector 2530 is a device that connects the RU device 2500 of the base station and the DU device 2550 of the base station, and may perform physical layer processing for message transmission and reception, transmit a message to the DU device 2550 of the base station, and receive a message from the DU device 2550 of the base station.

The DU device 2550 of the base station includes at least one processor and/or controller 2570, a connector 2560, and a storage unit 2580. However, the components of the DU device 2550 of the base station are not limited to the above-described example, and for example, the DU device 2550 of the base station may include more components or fewer components than the illustrated components. In addition, the connector 2560, the storage unit 2580, the controller 2570, and the like may be implemented in the form of a single chip.

The controller 2560 may control a series of processes so that the DU device 2550 of the base station can operate according to the above-described embodiment. For example, the controller 2560 may generate a C-plane message and a U-plane message to be transmitted to the RU device 2500 of the base station, and transmit the message to the RU device 2500 of the base station through the connector 2560. There may be a plurality of controllers 2560, and the controller 2560 may perform a component control operation of the DU device 2550 of the base station by executing a program stored in the storage unit 2580.

According to an embodiment, the controller 2560 may identify the subframe configuration information, and generate a control message including multimedia broadcast multicast service single frequency network (MBSFN)-related information for the subframe, based on the identification. In addition, the controller 2560 may control to transmit the generated control message to a radio unit (RU) of the base station connected to the digital unit through a connector 2560 to be described later.

The storage unit 2540 may store programs and data necessary for the operation of the RU device of the base station. In addition, the storage unit 2540 may store control information or data included in signals transmitted and received by the RU device of the base station. The storage unit 2540 may be composed of a storage medium such as ROM, RAM, hard disk, CD-ROM, and DVD, or a combination of storage media. In addition, there may be a plurality of storage units 2540.

The connector 2560 is a device that connects the RU device 2500 of the base station and the DU device 2550 of the base station, and may perform physical layer processing for message transmission/reception, transmit a message to the RU device 2500 of the base station, and receive a message from the RU device 2500 of the base station.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a digital unit of a base station in a wireless communication system supporting lower layer function division, the method comprising:
   identifying, by the digital unit of the base station, subframe configuration information;
   generating, by the digital unit of the base station, a control message for a radio unit of the base station comprising multimedia broadcast multicast service single frequency network (MBSFN)-related information for a subframe, based on the identification; and
   transmitting, by the digital unit of the base station, the generated control message to the radio unit of the base station communicatively connected to the digital unit of the base station,
   wherein the MBSFN-related information is for zero padding in the subframe by the radio unit of the base station, and
   wherein the MBSFN-related information comprises information indicating whether a normal cyclic prefix (CP) and an extended CP are mixed in the subframe, and information indicating a number of normal CPs in the subframe.

2. The method of claim 1, wherein the MBSFN-related information is configured based on a section extension field of the control message.

3. The method of claim 1, wherein the MBSFN-related information is configured based on a common header field of the control message.

4. The method of claim 1, wherein the MBSFN-related information is configured based on a section field of the control message.

5. A method performed by a radio unit of a base station in a wireless communication system supporting lower layer function division, the method comprising:
   receiving, by the radio unit of the base station, a control message for the radio unit of the base station including multimedia broadcast multicast service single frequency network (MBSFN)-related information for a subframe from a digital unit of the base station communicatively connected to the radio unit of the base station; and
   performing, by the radio unit of the base station, zero padding in the subframe, based on the MBSFN-related information,
   wherein the MBSFN-related information comprises information indicating whether a normal cyclic prefix (CP)

and an extended CP are mixed in the subframe, and information indicating a number of normal CPs in the subframe.

6. The method of claim 5, wherein the performing of the zero padding further comprises:
determining a zero padding size, based on a Fast Fourier Transform (FFT) size; and
performing the zero padding, based on the determined zero padding size.

7. The method of claim 5, wherein the MBSFN-related information is configured based on a section extension field of the control message.

8. The method of claim 5, wherein the MBSFN-related information is configured based on a common header field of the control message.

9. The method of claim 5, wherein the MBSFN-related information is configured based on a section field of the control message.

10. A digital unit of a base station in a wireless communication system supporting lower layer function division, the digital unit of the base station comprising:
a connector configured to transmit and receive a signal with a radio unit of the base station communicatively connected to the digital unit of the base station; and
at least one processor configured to:
identify subframe configuration information,
generate a control message for the radio unit of the base station comprising multimedia broadcast multicast service single frequency network (MBSFN)-related information for a subframe, based on the identification, and
control to transmit the generated control message to the radio unit of the base station,
wherein the MBSFN-related information is for zero padding in the subframe by the radio unit of the base station, and
wherein the MBSFN-related information comprises information indicating whether a normal cyclic prefix (CP) and an extended CP are mixed in the subframe, and information indicating a number of normal CPs in the subframe.

11. The digital unit of the base station of claim 10, wherein the MBSFN-related information is configured based on a section extension field of the control message.

12. The digital unit of the base station of claim 10, wherein the MBSFN-related information is configured based on a common header field of the control message.

13. The digital unit of the base station of claim 10, wherein the MBSFN-related information is configured based on a section field of the control message.

14. A radio unit of a base station in a wireless communication system supporting lower layer function division, the radio unit of the base station comprising:

a connector configured to transmit and receive a signal with a digital unit of the base station communicatively connected to the radio unit of the base station;
a transceiver configured to wirelessly transmit and receive a signal with a terminal; and
at least one processor configured to:
control to receive a control message for the radio unit of the base station comprising multimedia broadcast multicast service single frequency network (MBSFN)-related information for a subframe from the digital unit of the base station through the connector, and
control to perform zero padding in the subframe, based on the MBSFN-related information,
wherein the MBSFN-related information comprises information indicating whether a normal cyclic prefix (CP) and an extended CP are mixed in the subframe, and information indicating a number of normal CPs in the subframe.

15. The radio unit of the base station of claim 14, wherein the at least one processor is further configured to:
determine a zero padding size, based on a Fast Fourier Transform (FFT) size, and
control to perform the zero padding, based on the determined zero padding size.

16. The radio unit of the base station of claim 14, wherein the MBSFN-related information is configured based on a section extension field of the control message.

17. The radio unit of the base station of claim 14, wherein the MBSFN-related information is configured based on a common header field of the control message.

18. The radio unit of the base station of claim 14, wherein the MBSFN-related information is configured based on a section field of the control message.

19. The method of claim 5, further comprising, before performing the zero padding in the subframe, determining whether zero padding is required through one control plane message before an analysis of one subframe is completed.

20. The method of claim 19, further comprising, before performing the zero padding in the subframe, determining whether zero padding is required to fill a gap when the normal CP and the extended CP are mixed, and a length of a subframe defined in a standard is not met.

21. The radio unit of the base station of claim 14, wherein the at least one processor is further configured to, before performing the zero padding in the subframe, determine whether zero padding is required through one control plane message before an analysis of one subframe is completed.

22. The radio unit of the base station of claim 21, wherein the at least one processor is further configured to, before performing the zero padding in the subframe, determining whether zero padding is required to fill a gap when the normal CP and the extended CP are mixed, and a length of a subframe defined in a standard is not met.

* * * * *